(12) United States Patent
Takeda

(10) Patent No.: US 8,570,415 B2
(45) Date of Patent: Oct. 29, 2013

(54) IMAGE SENSING SYSTEM AND CONTROL METHOD THEREFOR

(75) Inventor: Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 12/494,401

(22) Filed: Jun. 30, 2009

(65) Prior Publication Data

US 2010/0020206 A1 Jan. 28, 2010

(30) Foreign Application Priority Data

Jul. 23, 2008 (JP) ................................. 2008-190231

(51) Int. Cl.
*H04N 9/083* (2006.01)
*H04N 5/217* (2011.01)
*H04N 3/14* (2006.01)

(52) U.S. Cl.
USPC ............................ 348/308; 348/241; 348/302

(58) Field of Classification Search
USPC ......... 348/241, 294, 300, 302, 308; 358/3.26, 358/3.27, 463; 257/291–292
See application file for complete search history.

(56) References Cited

U.S. PATENT DOCUMENTS

2002/0158982 A1* 10/2002 Kokubun et al. ............... 348/308
2007/0126901 A1* 6/2007 Kuroda ........................ 348/296
2008/0007638 A1* 1/2008 Aoki et al. ..................... 348/294
2008/0218615 A1* 9/2008 Huang et al. .................. 348/294
2009/0190020 A1* 7/2009 Gomi et al. .................... 348/308

FOREIGN PATENT DOCUMENTS

| JP | 2000-261730 A | 9/2000 |
| JP | 2006-148455 A | 6/2006 |
| JP | 2006-148455 | * 8/2006 |

* cited by examiner

*Primary Examiner* — Lin Ye
*Assistant Examiner* — Euel Cowan
(74) *Attorney, Agent, or Firm* — Fitzpatrick, Cella, Harper & Scinto

(57) ABSTRACT

An image sensing system comprises a solid-state image sensor including a plurality of pixels arranged in a matrix and vertical output lines connected by column to each pixel, with signals in accordance with voltages of the vertical output lines each output to a horizontal output line via column circuits provided for each vertical output line. Electrical charges in photoelectric conversion elements included in the pixels are not output to the vertical output lines, while signals corresponding to voltages of the vertical output lines and output to the horizontal output line via the column circuits are averaged by column to acquire a correction value. Then, electrical charges in the photoelectric conversion elements are output by row to the vertical output lines, and signals corresponding to voltages of the vertical output lines and output to the horizontal output line via the column circuits are corrected using the correction value.

11 Claims, 18 Drawing Sheets

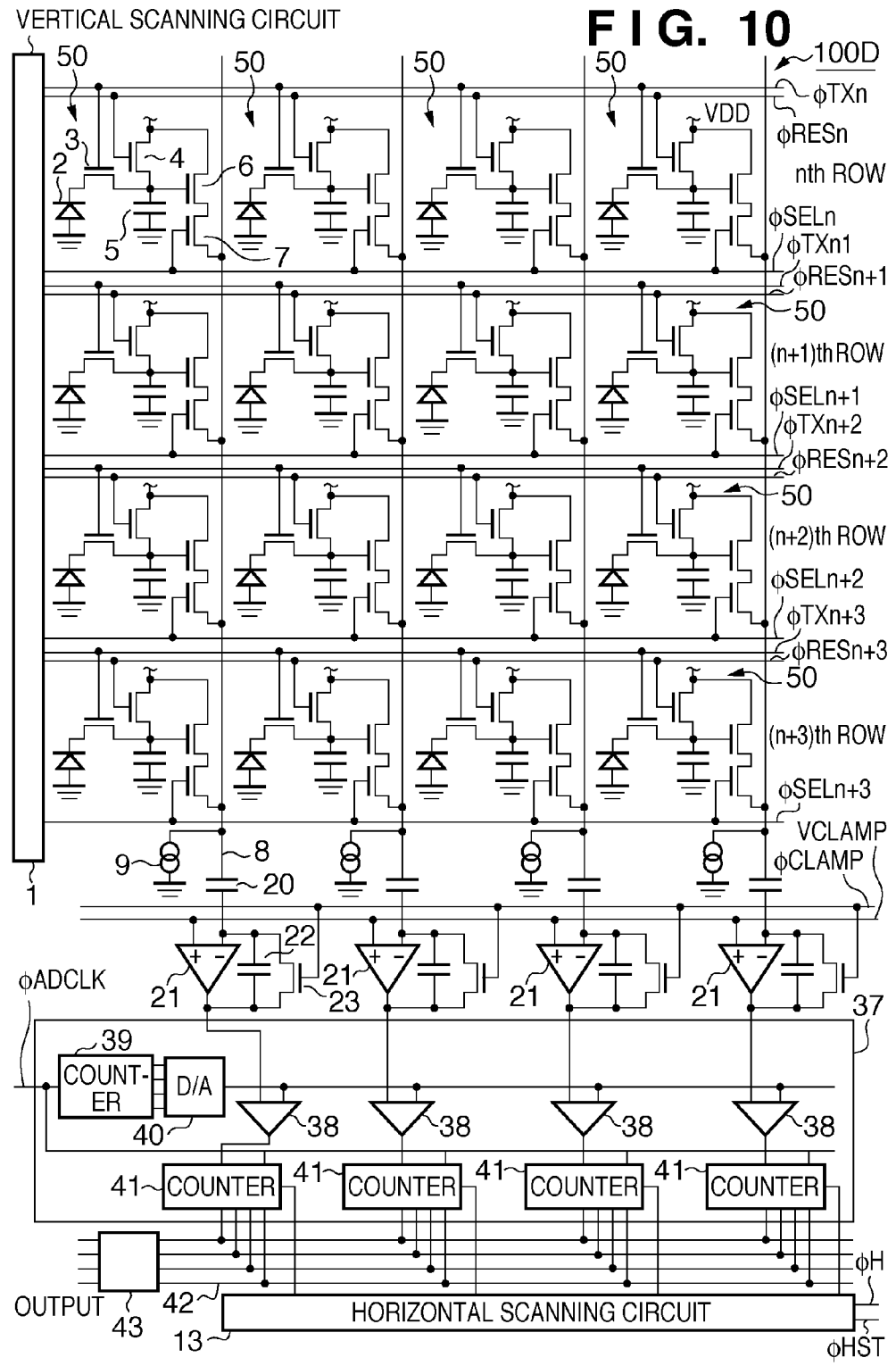
F I G. 10

US 8,570,415 B2

IMAGE SENSING SYSTEM AND CONTROL METHOD THEREFOR

BACKGROUND OF THE INVENTION

1. Field of the Invention

The present invention relates to an image sensing system and a control method therefor, and more particularly, to an image sensing system for driving a solid-state image sensor composed of a CMOS image sensor including a column circuit, and a control method therefor.

2. Description of the Related Art

Conventionally, CMOS image sensors have been known as XY addressing type image sensors which are capable of reading out electrical charges for each pixel. It is to be noted that the CMOS is an abbreviation of a Complementary Metal-Oxide Semiconductor. CMOS image sensors have advantages such as their smaller power consumption, lower driving voltage, and the ability to speed up charge readout, as compared with CCDs of conventionally mainstream image sensors.

Furthermore, CMOS image sensors allow on-chip peripheral circuits, and CMOS image sensors have been thus developed which include on-chip circuits for each column of pixels arranged in a matrix. For example, various techniques have been proposed, including a technique for achieving high S/N with on-chip amplification circuits for each column, and a technique for achieving speeding up by A/D conversion using on-chip A/D converters for each column.

On the other hand, differences in characteristics among the on-chip circuits provided for each column are caused due to variations in manufacturing process, causing vertical-stripe fixed pattern noise in shot images. It is to be noted that such noise caused by differences in circuit characteristics for each column is referred to as column noise.

Japanese Patent Laid-Open No. 2000-261730 discloses a technique for reducing such column noise. More specifically, in Japanese Patent Laid-Open No. 2000-261730, a vertical black reference region shielded from light is provided separately from an effective pixel region, and output signals from the vertical black reference region are used to acquire column noise. Then, the acquired column noise is stored as digital values, and the stored digital values are used to correct shot image signals in the effective pixel region, thereby allowing favorable images with reduced vertical-stripe column noise to be obtained.

However, according to the method described in Japanese Patent Laid-Open No. 2000-261730, high-accuracy correction data is required in order to correct column noise correctly, and the method thus has a problem in that a region comprised of a number of pixels for acquiring the correction data is required separately from an effective pixel region, because much more pixel data needs to be averaged in the vertical direction in order to sufficiently reduce random noise during correction data acquisition.

Furthermore, in a case in which it is not possible to sufficiently reduce random noise during correction data acquisition, or in a case in which the pixel region for acquiring correction data has defects and the like, the accuracy of acquired correction data will be lowered. In a case in which such low-accuracy correction data is used to carry out correction, there is a problem in that vertical-stripe noise is caused rather than reduced.

Moreover, in a case in which output signals from pixels shielded from light are used to acquire correction data, there is a problem in that the correction data accuracy is lowered, for example, in a case in which there are abnormal pixels such as pixel defects, or due to the effect of unevenness and the like resulting from dark current.

SUMMARY OF THE INVENTION

The present invention has been made in consideration of the above situation, and provides an image sensing system which is able to acquire column noise with sufficient accuracy, without the use of any pixel region for correcting column noise other than an effective pixel region, and a control method therefor.

According to the present invention, the foregoing object is attained by providing an image sensing system comprising a solid-state image sensor in which a plurality of pixels are arranged in a matrix, vertical output lines are connected by column to each of the plurality of pixels, and signals in accordance with voltages of the vertical output lines are each output to a horizontal output line via column circuits provided for each of the vertical output lines, the image sensing system comprising: a vertical output unit configured to output voltages in accordance with electrical charges from the plurality of pixels by row to the vertical output lines; a horizontal output unit configured to sequentially output signals in accordance with voltages of the vertical output lines to the horizontal output line via the column circuits; a control unit configured to control the vertical output unit and the horizontal output unit by one of a first driving method and a second driving method; an averaging unit configured to average signals from the horizontal output line by column to acquire a correction value, the signals obtained by exercising control by the first driving method; and a correction unit configured to correct signals from the horizontal output line using the correction value obtained from the averaging unit, the signals obtained by exercising control by the second driving method, wherein the first driving method is a driving method in which the vertical output unit is controlled in such a way that voltages in accordance with electrical charges obtained in photoelectric conversion elements included in the plurality of pixels are not output to the vertical output lines and the horizontal output unit is controlled in such a way that signals in accordance with voltages of the vertical output lines are output to the horizontal output line via the column circuits, and the second driving method is a driving method in which the vertical output unit is controlled in such a way that voltages in accordance with electrical charges obtained in the photoelectric conversion elements are output to the vertical output lines and the horizontal output unit is controlled in such a way that signals in accordance with voltages of the vertical output lines are output to the horizontal output line via the column circuits.

According to the present invention, the foregoing object is also attained by providing a control method for an image sensing system comprising a solid-state image sensor in which a plurality of pixels are arranged in a matrix, vertical output lines are connected by column to each of the plurality of pixels, and signals in accordance with voltages of the vertical output lines are each output to a horizontal output line via column circuits provided for each of the vertical output lines, the control method comprising: a first outputting step of exercising control in such a way that voltages in accordance with electrical charges obtained in photoelectric conversion elements included in the plurality of pixels are not output to the vertical output lines, and signals in accordance with voltages of the vertical output lines are output to the horizontal output line via the column circuits; an averaging step of averaging the signals obtained in the first outputting step by column to acquire a correction value; a second outputting step of outputting, by row, voltages in accordance with electrical charges obtained in the photoelectric conversion elements included in the plurality of pixels to the vertical output lines, and outputting signals in accordance with voltages of the vertical output lines to the horizontal output line via the column circuits; and a correction step of correcting the signals obtained in the second outputting step using the correction value obtained in the averaging step.

Further, according to the present invention, the foregoing object is also attained by providing an image sensing system comprising a solid-state image sensor comprising a plurality of pixels arranged in a matrix, vertical output lines connected by column to each of the plurality of pixels, column circuits provided for each of the vertical output lines, a horizontal output line connected to the column circuits, a vertical output unit for outputting voltages in accordance with electrical charges from the plurality of pixels to the vertical output lines, and a horizontal output unit for outputting signals in accordance with voltages of the vertical output lines to the horizontal output line via the column circuits; a control unit configured to control the solid-state image sensor by one of a first driving method and a second driving method; a correction signal generating unit configured to generate a correction signal from signals output from the solid-state image sensor by controlling the solid-state image sensor by the first driving method; and a correction unit configured to correct signals output from the solid-state image sensor by controlling the solid-state image sensor by the second driving method, based on the correction signal generated by the correction signal generating unit, wherein the first driving method is a driving method in which the vertical output unit is controlled in such a way that voltages in accordance with electrical charges obtained in photoelectric conversion elements included in the plurality of pixels are not output to the vertical output lines and the horizontal output unit is controlled in such a way that signals in accordance with voltages of the vertical output lines are output to the horizontal output line via the column circuits, and the second driving method is a driving method in which the vertical output unit is controlled in such a way that voltages in accordance with electrical charges obtained in the photoelectric conversion elements are output to the vertical output lines and the horizontal output unit is controlled in such a way that signals in accordance with voltages of the vertical output lines are output to the horizontal output line via the column circuits.

Further, features of the present invention will become apparent from the following description of exemplary embodiments (with reference to the attached drawings).

BRIEF DESCRIPTION OF THE DRAWINGS

FIG. 10 is a diagram illustrating the configuration of an example of an image sensor according to a fourth embodiment of the present invention;

DESCRIPTION OF THE EMBODIMENTS

Preferred embodiments of the present invention will be described in detail in accordance with the accompanying drawings.

Figure 1:
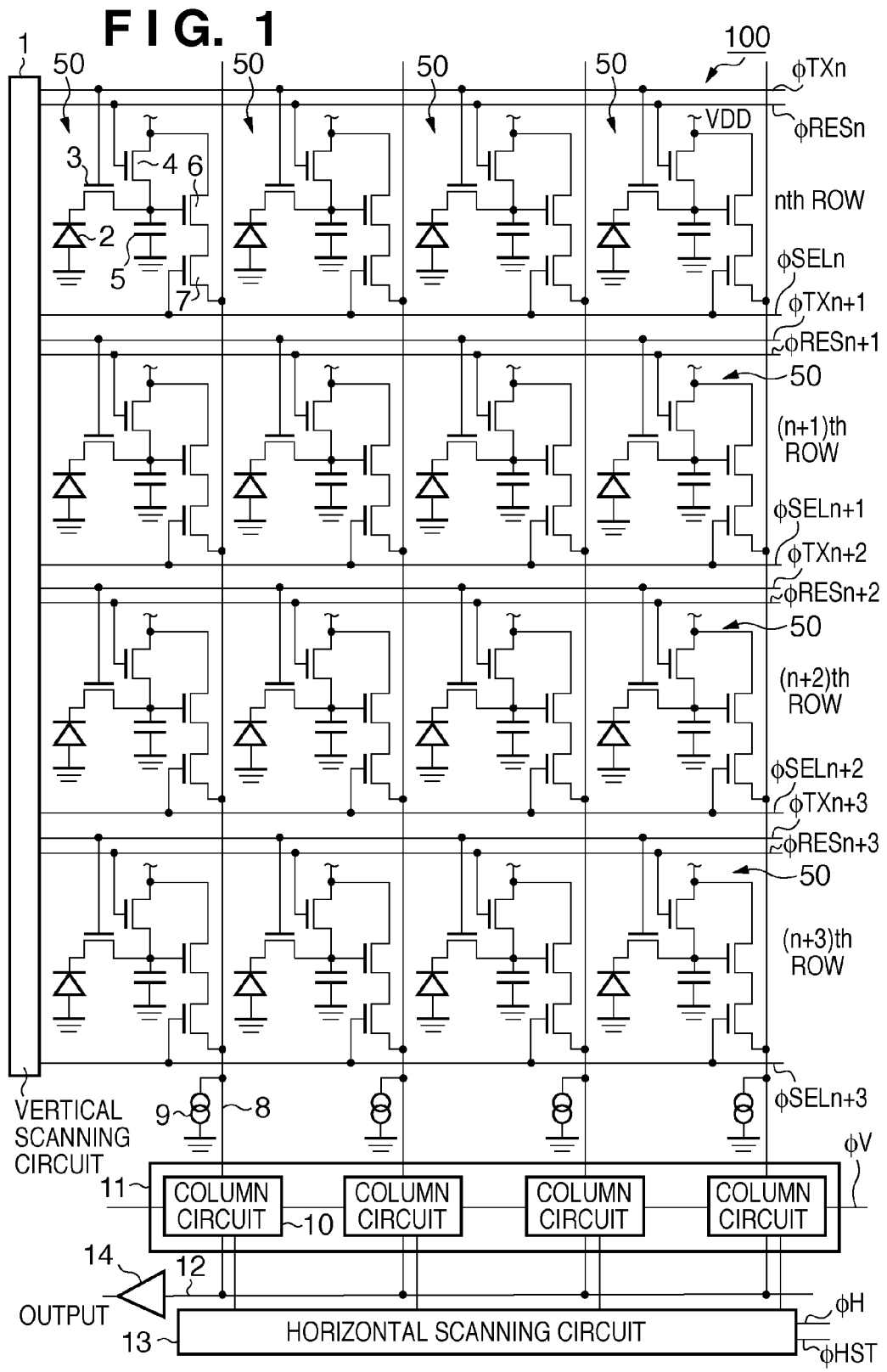
FIG. 1 is a diagram illustrating the configuration of an example of a CMOS image sensor which is applicable to the present invention.

FIG. 1 shows the configuration of an example of an image sensor 100, a CMOS solid-state image sensor, which is applicable to the present invention. Thus, the present invention is applicable to the image sensor 100 which has a common configuration. In the image sensor 100, pixels 50, 50, . . . are arranged in matrix. It is to be noted below that a line of pixels in the vertical direction in the matrix is referred to as a "column", whereas a line of pixels in the horizontal direction is referred to as a "row".

A vertical scanning circuit 1 controls reading out of electrical charges from the pixels 50, 50, . . . by row in such a way that a signal φTXn, a signal φRESn, and a signal φSELn are supplied to each of the pixels 50, 50, 50 . . . .

Each of the pixels 50, 50, . . . has a photodiode 2, a transfer switch 3, a reset switch 4, an accumulation capacitor 5, a source follower amplifier 6, and a row selection switch 7. The photodiode 2 as a photoelectric conversion element generates a signal charge depending on irradiation light by photoelectric conversion, and accumulates the signal charge. The transfer switch 3 controls transfer of the electric charge generated and accumulated in the photodiode 2 to the accumulation capacitor 5. The reset switch 4 controls resetting of unneeded electrical charges accumulated in the photodiode 2 or the accumulation capacitor 5. The source follower amplifier 6 amplifies the signal charge accumulated in the accumulation capacitor 5, and converts the amplified signal charge to a voltage. The reset switch 4, the accumulation capacitor 5, and the source follower amplifier 6 constitute a floating diffusion amplifier. The row selection switch 7 controls connection of the output of the source follower amplifier 6 to a vertical output line 8.

A load current source 9 drives the source follower amplifier 6 in the row selected by the row selection switch 7, via the vertical output line 8. Each vertical output line 8 is connected to each column circuit 10 prepared for each column of the matrix. It is to be noted that the column circuits 10, 10, . . . are collectively referred to as a column circuit group 11 where convenient. A horizontal scanning circuit 13 causes sequential output of signals from the column circuits 10 to horizontal output line 12 in accordance with a horizontal clock φH. An output amplifier 14 outputs signals on the horizontal output line 12 to the outside of the image sensor 100.

The configuration of the image sensor 100 thus exemplified in FIG. 1 is formed in an on-chip manner, for example, with the use of a CMOS structure.

Figure 2:
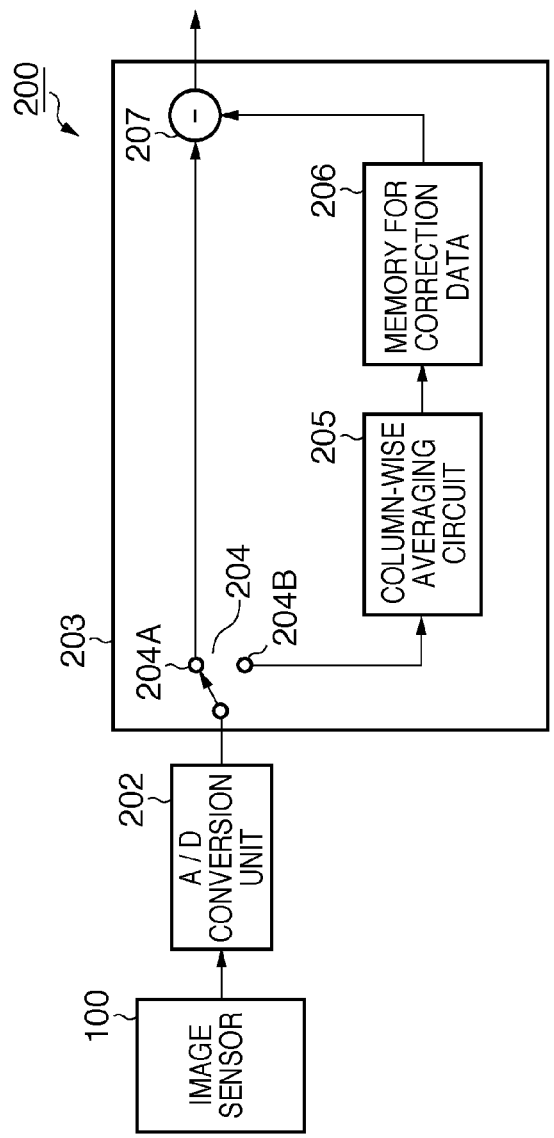
FIG. 2 is a block diagram illustrating the configuration of an example of a column noise correction circuit for correcting column noise, which is applicable to embodiments of the present invention.

FIG. 2 shows the configuration of an example of a column noise correction circuit 200 for correcting column noise, which is according to embodiments of the present invention. Output signals output from the output amplifier 14 of the image sensor 100 are subjected to various types of analog processing by an analog processing circuit, not shown, and then converted to digital signals by an A/D conversion unit 202 to obtain image data. This image data is input into a correction processing circuit 203, and supplied to a switch 204.

The switch 204 has an output terminal 204A input into a minuend input terminal of a subtracter 207. The switch 204 also has an output terminal 204B input into a column-wise averaging circuit 205. In a case in which column noise acquisition operation (as will hereinafter be described in detail) for the image sensor 100 is to be carried out, the switch 204 is controlled so as to select the output terminal 204B. On the other hand, in a case in which image signals of a subject image are output from the image sensor 100, the switch 204 is controlled so as to select the output terminal 204A.

In a case in which the image sensor 100 carries out column noise acquisition operation, and more specifically, in a case in which column noise of the image sensor 100 is to be detected, the output of the A/D conversion unit 202 is input into the column-wise averaging circuit 205 via the switch 204. The column-wise averaging circuit 205 averages, for each column, column noise signals sequentially input for each column in accordance with the horizontal clock φH. The column noise signals averaged for each column in the column-wise averaging circuit 205 are stored in a memory 206 for correction data. It is to be noted that, as will hereinafter be described in detail, this column noise acquisition operation is carried out prior to the reading out of electrical charges from each pixel 50, 50, . . . in the image sensor 100.

In a case in which a shot image of a subject image is output from the image sensor 100, the switch 204 selects the output terminal 204A. Pieces of image data obtained by converting image signals output from the image sensor 100 into digital signals in the A/D conversion unit 202 are sequentially input to the minuend input terminal of the subtracter 207. The memory 206 for correction data is connected to a subtrahend input terminal of the subtracter 207. In synchronization with the input of the image data into the subtracter 207, column noise signals are sequentially read out from the memory 206 for correction data and input into the subtracter 207, and the column noise signals of the corresponding columns are subtracted from the image data. This allows column noise in the image data to be reduced. The image data with column noise reduced by the subtracter 207 is output from the column noise correction circuit 200 and input into the subsequent signal processing circuit.

<More Specific Examples of the Embodiment of the Present Invention>

The column noise acquisition operation according to the present invention will be described below with reference to first through sixth embodiments, in which respective specific examples are applied to the column circuits 10, 10, . . . in FIG. 1. It is to be noted that the column noise acquisition operation described below is operation for one horizontal period unless otherwise noted. Furthermore, in each embodiment, actual acquisition of correction data is carried out with the correction data accuracy enhanced by averaging, for each column, column noise acquired through the operation for column noise acquisition carried out more than once, as described with reference to FIG. 2.

<First Embodiment>

Figure 3:
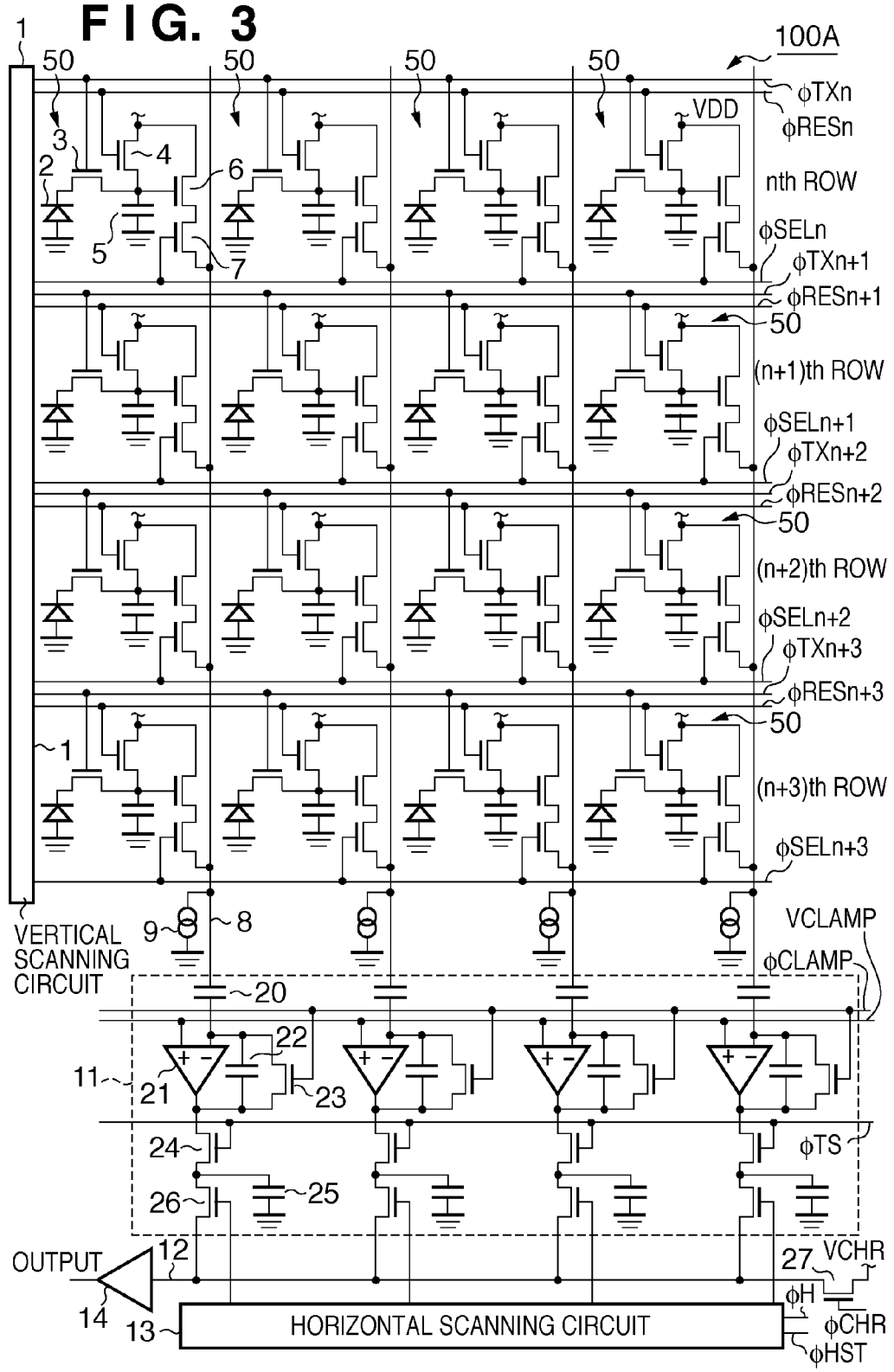
FIG. 3 is a diagram illustrating the configuration of an example of an image sensor according to a first embodiment of the present invention.

A first embodiment of the present invention provides examples of an image sensor in a case in which column amplifiers are applied as the column circuits 10, 10, . . . in the column circuit group 11, and of a driving method for the image sensor. FIG. 3 shows the configuration of an example of an image sensor 100A according to the first embodiment. It is to be noted that in FIG. 3, elements in common with FIG. 1 described above are denoted by the same reference numerals, and detailed description of the elements is omitted.

In FIG. 3, what is different from FIG. 1 is only the column circuit group 11, with the remaining configuration such as the pixels 50, 50, . . . the same as in FIG. 1. In the column circuit group 11, the vertical output line 8 is connected to an inverting input terminal of a column amplifier 21 via a clamp capacitor 20. The inverting input terminal of the column amplifier 21 is connected to an output terminal of the column amplifier 21 via a feedback capacitor 22. The amplification rate of the column amplifier 21 is determined by the ratio between the clamp capacitor 20 and the feedback capacitor 22. The inverting input terminal and output terminal of the column amplifier 21 are further connected via a clamp switch 23 whose ON/OFF is controlled in accordance with a signal φCLAMP. A signal VCLAMP is input to a non-inverting input terminal of the column amplifier 21.

The output signal of the column amplifier 21 is transferred to a transfer capacitor 25 via a transfer gate 24 whose ON/OFF is controlled in accordance with a signal φTS, and stored in the transfer capacitor 25. The signal stored in the transfer capacitor 25 is output to the horizontal output line 12 via, as a reading switch, a transfer gate 26 whose ON/OFF is controlled in accordance with a horizontal clock φH by the horizontal scanning circuit 13.

Figure 4:
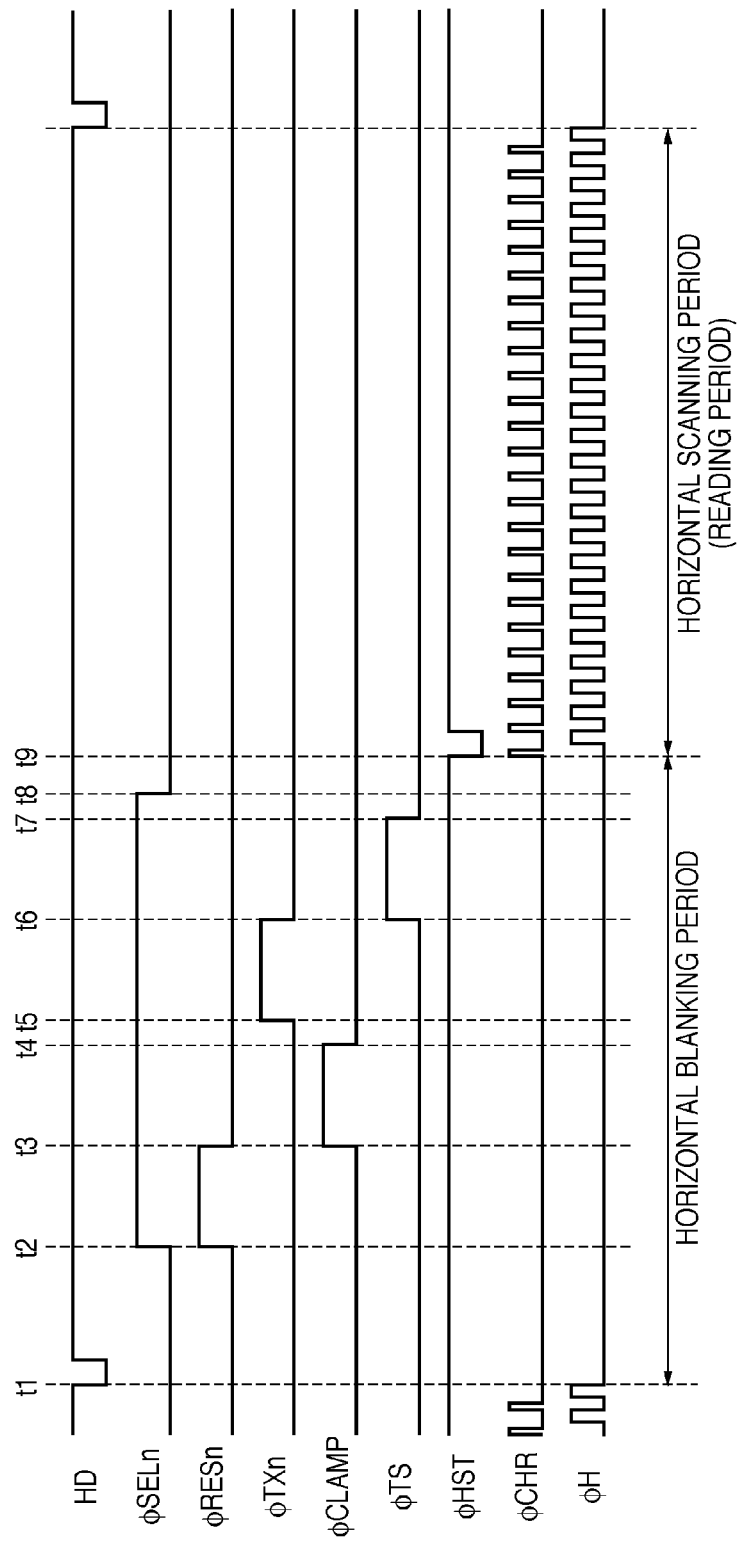
FIG. 4 is a timing chart showing a drive timing example for one horizontal period in the case of reading out electrical charges from pixels by normal readout, according to the first embodiment of the present invention.

FIG. 4 is a timing chart showing a drive timing example for one horizontal period in the case of reading out electrical charges by normal readout from the pixels 50, 50, . . . in the configuration of FIG. 3. In the figure, each signal goes one of a High state (referred to as "H") and a Low state (referred to as "L"). This is also the same for the following similar timing charts.

A signal HD indicates the beginning of one horizontal period, and a signal φHST indicates the start of a horizontal scanning period, that is, the start of the output of output signals for each column to the horizontal output line 12 by the horizontal scanning circuit 13. The period from time t1 at which the signal HD goes "L" to time t9 at which the signal φHST goes "L" refers to a horizontal blanking period. During the horizontal blanking period, signals for one row read out from the pixels 50, 50, . . . are transferred to the transfer capacitor 25 via the column amplifier 21, and stored in the transfer capacitor 25. During the horizontal blanking period, the horizontal scanning clock φH is stopped.

An explanation will be given below with attention paid to operation for the nth row pixels in a matrix composed of the pixels 50, 50, . . . . At time t2, the nth row signal φSEL goes "H" to turn ON the row selection switches 7, thereby connecting the circuit in the nth row pixels 50 to the vertical output lines 8.

It is to be noted hereinafter that the "nth row signal φSEL" is referred to as a signal φSELn with a subscript n assigned. This applies to the other types of signals as well. Furthermore, where convenient, the "nth row pixel 50" is referred to as a pixel 50.

At time t2, a signal φSELn goes "H" to turn ON the selection switches 7 and thus connect the circuits in the nth row pixels 50 to the vertical output lines 8, and to turn ON the reset switches 4 and thus reset unneeded charges accumulated the accumulation capacitors 5. At time t3, a signal φRESn goes "L" to turn OFF the reset switches 4, thus completing resetting.

Furthermore, at time t3, a signal φCLAMP goes "H" to turn ON the clamp switches 23, thereby clamping noise components generated in the pixels 50 in the clamp capacitors 20 connected to the vertical output lines 8. At time t4, the signal φCLAMP goes "L" to turn OFF the clamp switches 23, thus completing the clamping of noise components generated in the pixels 50 to the clamp capacitors 20.

At time t5, the signal φTXn goes "H" to turn ON the transfer switches 3, transferring signal charges accumulated in the photodiodes 2 to the accumulation capacitors 5. At time t6, the signal φTXn goes "L" to turn OFF the transfer switches 3, completing the transfer of the signal charges to the accumulation capacitors 5, and the signal φTS goes "H" to turn ON the transfer gates 24. When the transfer gates 24 are turned ON, the signal charges of the accumulation capacitors 5 in the pixels 50 are amplified and converted to voltages by the source follower amplifiers 6, and output to the vertical output lines 8. The signals output to the vertical output lines 8 are transferred to the transfer capacitors 25 via the corresponding clamp capacitors 20 and column amplifiers 21, and stored in the transfer capacitors 25.

It is to be noted that after the clamping described above at time t4 is completed, a differential signal between the signal input to the clamp capacitor 20 from the vertical output line 8 and the noise component clamped in the clamp capacitor 20 during the period from time t3 to time t4 is amplified and output from the column amplifier 21.

At time t7, the signal φTS goes "L" to turn OFF the transfer gates 24, completing the storage in the transfer capacitors 25. Then, at time t8, the signal φSELn goes "L" to turn OFF the row selection switches 7.

From time t9, one horizontal scanning period is started for the nth row signals. In one horizontal scanning period, input of horizontal scanning clocks φH to the horizontal scanning circuit 13 is started. The horizontal scanning circuit 13 sequentially turns on the transfer gates 26 in accordance with the horizontal scanning clocks φH, and the signals stored in the transfer capacitors 25 connected to the transfer gates 26 turned ON are sequentially output to the horizontal output line 12, and the nth row image signals are output from the output amplifier 14.

It is to be noted that the horizontal output line 12 is connected to a horizontal output line reset switch 27 whose ON/OFF is controlled in accordance with a signal φCHR and which is reset to a voltage VCHR for each horizontal scanning clock φH.

Figure 5:
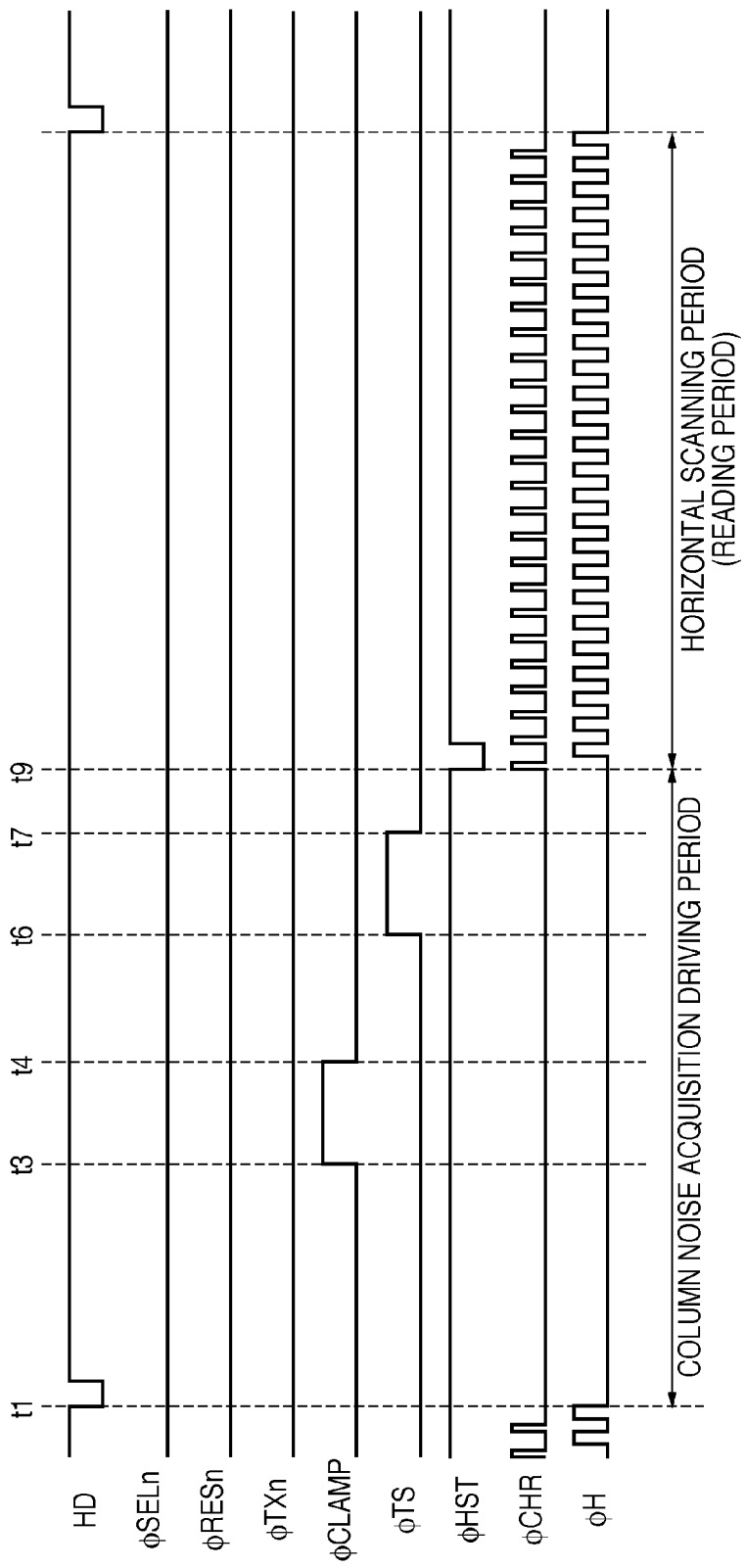
FIG. 5 is a timing chart showing a drive timing example for one horizontal period, in column noise acquisition according to the first embodiment of the present invention.

Next, column noise acquisition operation according to the first embodiment of the present invention will be described with reference to FIGS. 3 and 5. FIG. 5 is a timing chart showing a drive timing example for one horizontal period, in column noise acquisition according to the first embodiment.

In the first embodiment, with the horizontal blanking period from time t1 to time t9 in FIG. 5 as a column noise acquisition driving period, column noise acquisition for one row is carried out within this period. More specifically, the column noise acquisition driving period refers to a period during which column noise signals for one row are, for each column, stored in the transfer capacitors 25 via the column amplifiers 21. During the column noise acquisition driving period, the horizontal scanning clock φH is stopped.

At time t3, the signal φCLAMP goes "H" to turn ON the clamp switches 23, and clamp the signal level of the current vertical output line 8 in the clamp capacitor 20. At time t4, the signal φCLAMP goes "L" to turn OFF the clamp switches 23, completing the clamping of the signal level of the vertical output line 8 in the clamp capacitor 20. Then, at time t6, the signal φTS goes "H" to turn ON the transfer gates 24, and the output signals of the column amplifiers 21 are thus transferred to the transfer capacitors 25 and stored in the transfer capacitors 25.

It is to be noted that after the clamping in the clamp capacitors 20 at time t4 is completed, the differential signal between the signal level of the vertical output line 8 clamped during the period from time t3 to time t4 and the signal level of the current vertical output line 8 is amplified and output from the column amplifier 21. As indicated by the signal φSELn in FIG. 5, the signal φSELn is kept at "L" during the column noise acquisition driving period, without connecting the circuits of the pixels 50 to the vertical output line 8. Therefore, the signal level of the vertical output line 8 is not changed.

At time t9, the column noise acquisition driving period is completed, and when the horizontal scanning period is started, the column noise signals for one row are sequentially output for each column from the output amplifier 14 in accordance with the horizontal scanning clocks φH. The signals output from the output amplifier 14 are input to the column noise correction circuit 200 described with reference to FIG. 2.

In the column noise acquisition operation, the switch 204 of the column noise correction circuit 200 selects the output terminal 204B, and the signals output from the output amplifier 14 are converted into digital signals in the A/D conversion unit 202 and input to the column-wise averaging circuit 205. The column-wise averaging circuit 205 sequentially adds the signals input from the A/D conversion unit 202 for each column, and averages the addition results for each column and stores the averages as column noise correction data in the memory 206 for correction data.

As described above, according to the first embodiment, column noise generated in the column amplifiers 21 and column noise caused by the transfer gates 24, the transfer capacitors 25, and the transfer gates 26 can be acquired without the use of a pixel region other than the effective pixel region. Then, correction data can be obtained on the basis of the acquired column noise. Therefore, the correction data can be used to correct column noise generated in the column amplifiers 21 and column noise caused by the transfer gates 24, the transfer capacitors 25, and the transfer gates 26 in pixel signals.

<Second Embodiment>

Figure 6:
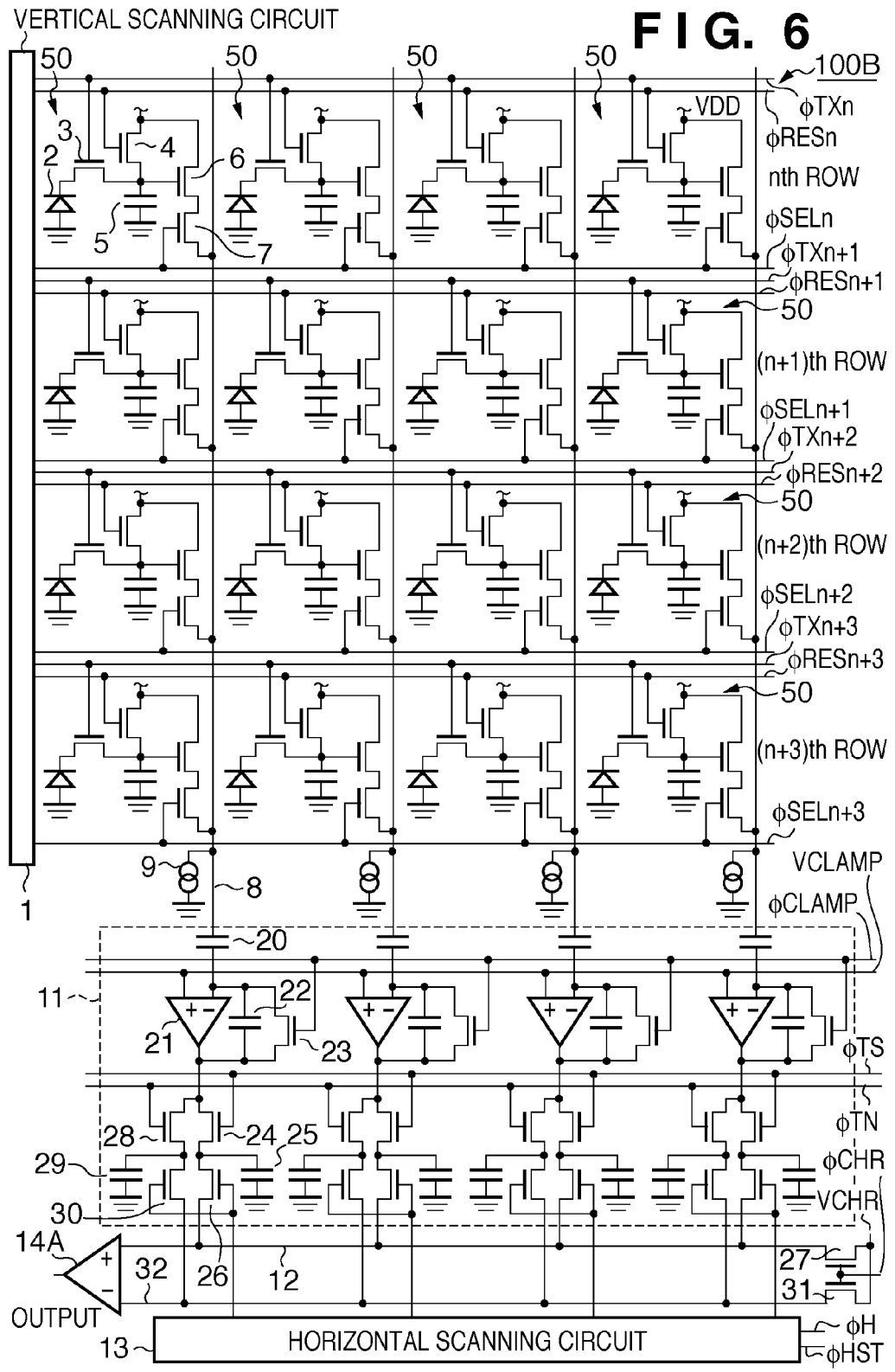
FIG. 6 is a diagram illustrating the configuration of an example of an image sensor according to a second embodiment of the present invention.

Next, a second embodiment of the present invention will be described. The second embodiment provides examples of an image sensor in a case in which column amplifiers and noise removal circuits are applied as the column circuits 10, 10, . . . in the column circuit group 11, and of a driving method for the image sensor. FIG. 6 shows the configuration of an example of an image sensor 100B according to the second embodiment. It is to be noted that in FIG. 6, elements in common with FIGS. 1 and 3 described above are denoted by the same reference numerals, and detailed description of the elements is omitted.

In FIG. 6, transfer gates 28, the transfer capacitors 29, and the transfer gates 30 constituting the noise removal circuits are added, in contrast to the column circuit group 11 in FIG. 3 described above. In addition, an output amplifier 14A acts as a differential amplifier with inverting input and non-inverting input, and a reset switch 31 is added.

The output signal of the column amplifier 21 is transferred to the transfer capacitor 25 via the transfer gate 24 whose ON/OFF is controlled in accordance with a signal φTS and stored in the transfer capacitor 25, and transferred to the transfer capacitor 29 via the transfer gate 28 whose ON/OFF is controlled in accordance with a signal φTN and stored in the transfer capacitor 29. The signal stored in the transfer capacitor 25 is output to the horizontal output line 12 via, as a reading switch, the transfer gate 26 whose ON/OFF is controlled in accordance with a horizontal clock φH by the horizontal scanning circuit 13. Furthermore, the signal transferred to the transfer capacitor 29 is output to a horizontal output line 32 via, as a reading switch, the transfer gate 30 whose ON/OFF is controlled in accordance with a horizontal clock φH by the horizontal scanning circuit 13.

As will hereinafter be described in detail, shot image signals are output to the horizontal output line 12, whereas column noise signals are output to the horizontal output line 32. The output amplifier 14A subtracts the noise signals input from the horizontal output line 32, from the shot image signals input from the horizontal output line 12, and outputs the result to the outside of the image sensor 100B.

Figure 7:
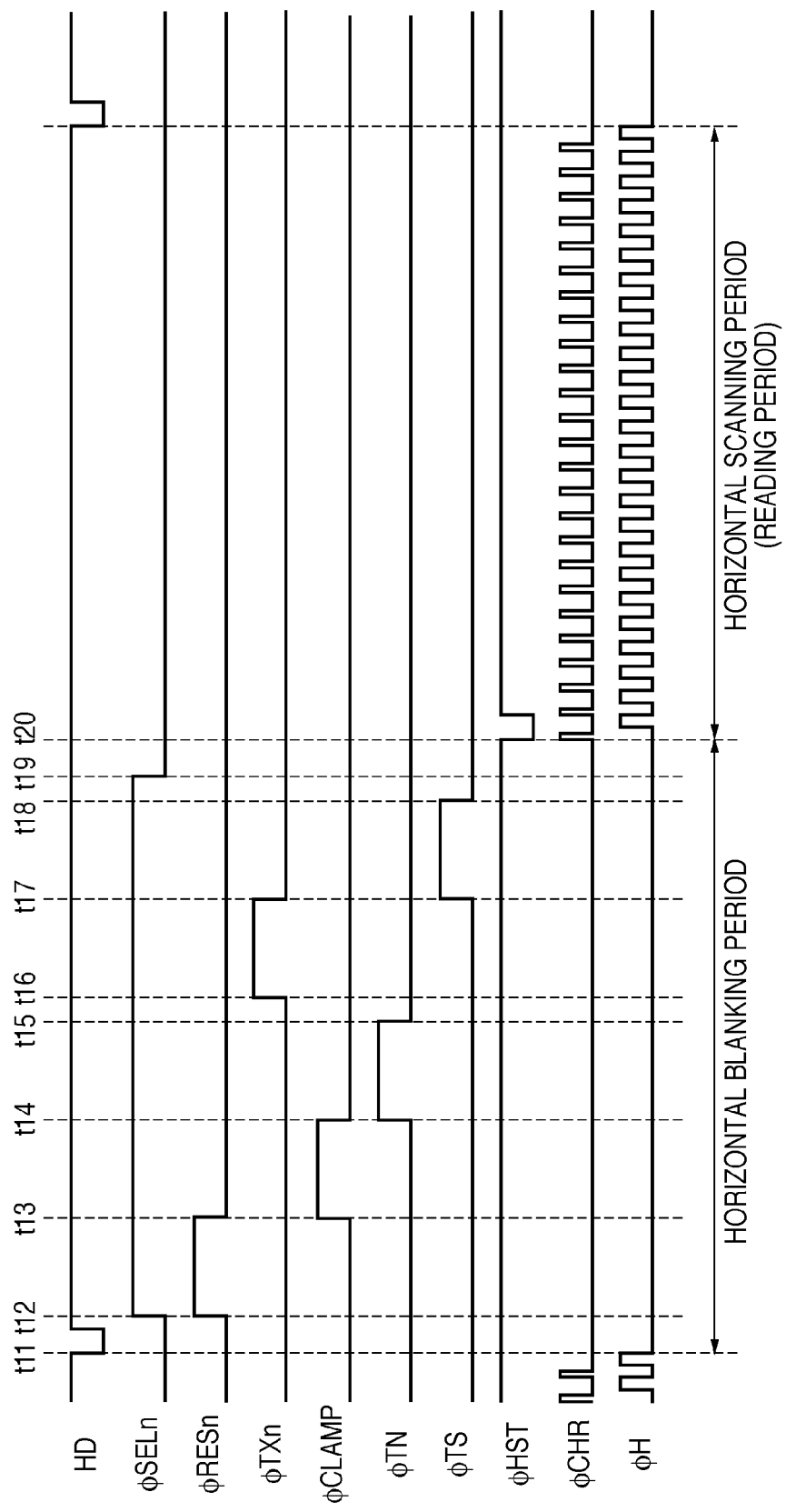
FIG. 7 is a timing chart showing a drive timing example for one horizontal period in the case of reading out electrical charges from pixels by normal readout, according to the second embodiment of the present invention.

FIG. 7 is a timing chart showing a drive timing example for one horizontal period in the case of reading out electrical charges by normal readout from the pixels 50, 50, . . . , in the configuration of FIG. 6.

A signal HD indicates the beginning of one horizontal period, and a signal φHST indicates the start of a horizontal scanning period, that is, the start of reading out in the horizontal direction from the pixels 50, 50, . . . . The period from time t11 at which the signal HD goes "L" to time t19 at which the signal φHST goes "L" refers to a horizontal blanking period. During the horizontal blanking period, signals for one row read out from the pixels 50, 50, . . . are transferred to the transfer capacitors 25 via the column amplifiers 21, and stored in the transfer capacitors 25. During the horizontal blanking period, the horizontal scanning clock φH is stopped.

At time t12, a signal φSEL goes "H" to turn ON the row selection switches 7, thereby connecting the circuits in the nth row pixels 50 to the vertical output lines 8, and turn ON the reset switches 4, thereby resetting unneeded charges accumulated in the accumulation capacitors 5. At time t13, a signal φRESn goes "L" to turn OFF the reset switches 4, thereby completing the resetting.

Furthermore, at time t13, a signal φCLAMP goes "H" to turn ON the clamp switches 23, thereby clamping noise components generated in the pixels 50 in the clamp capacitors 20 connected to the vertical output lines 8. At time t14, the signal φCLAMP goes "L" to turn OFF the clamp switches 23, thereby completing the clamping of noise components generated in the pixels 50 in the clamp capacitors 20. At time t14, a signal φTN goes "H" to turn ON the transfer gates 28, and transfer noise components generated in the column amplifiers 21 to the transfer capacitors 29 and store the noise components in the transfer capacitors 29. At time t15, the signal φTN goes "L" to complete the storage of noise components generated in the column amplifiers 21 in the transfer capacitors 29.

At time t16, a signal φTXn goes "H" to turn ON the transfer switches 3, transferring signal charges accumulated in the photodiodes 2 to the accumulation capacitors 5. At time t17, the signal φTXn goes "L" to turn OFF the transfer switches 3, completing the transfer of signal charges to the accumulation capacitors 5, and the signal φTS goes "H" to turn ON the transfer gates 24. When the transfer gates 24 are turned ON, the signal charges of the accumulation capacitors 5 in the pixels 50 are amplified and converted to voltages by the source follower amplifiers 6 to output the voltages to the vertical output lines 8. The signals output to the vertical output lines 8 are transferred to the transfer capacitors 25 via the corresponding clamp capacitors 20 and column amplifiers 21, and stored in the transfer capacitors 25.

At time t18, the signal φTS goes "L" to complete the storage of signals output from the vertical output lines 8 in the transfer capacitors 25. Then, at time t19, the signal φSELn goes "L" to turn OFF the row selection switches 7.

Subsequently, from time t20, one horizontal scanning period is started for the nth row signals. In one horizontal scanning period, input of horizontal scanning clocks φH to the horizontal scanning circuit 13 is started. The horizontal scanning circuit 13 sequentially turns on the transfer gates 26 and 30 in accordance with the horizontal scanning clocks φH. The image signals stored in the transfer capacitors 25 connected to the transfer gates 26 turned ON are sequentially output to the horizontal output line 12, and the noise signals stored in the transfer capacitors 29 connected to the transfer gates 30 turned ON are sequentially output to the horizontal output line 32. In the output amplifier 14A, the noise signals input from the horizontal output line 32 are subtracted from the image signals input from the horizontal output line 12, and the image signals from which the noise signals are subtracted are output as image signals for one row.

It is to be noted that the horizontal output lines 12 and 32 are connected to horizontal output line reset switches 27 and 31 whose ON/OFF are controlled in accordance with a signal φCHR and which are reset to a voltage VCHR for each horizontal scanning clock φH.

Figure 8:
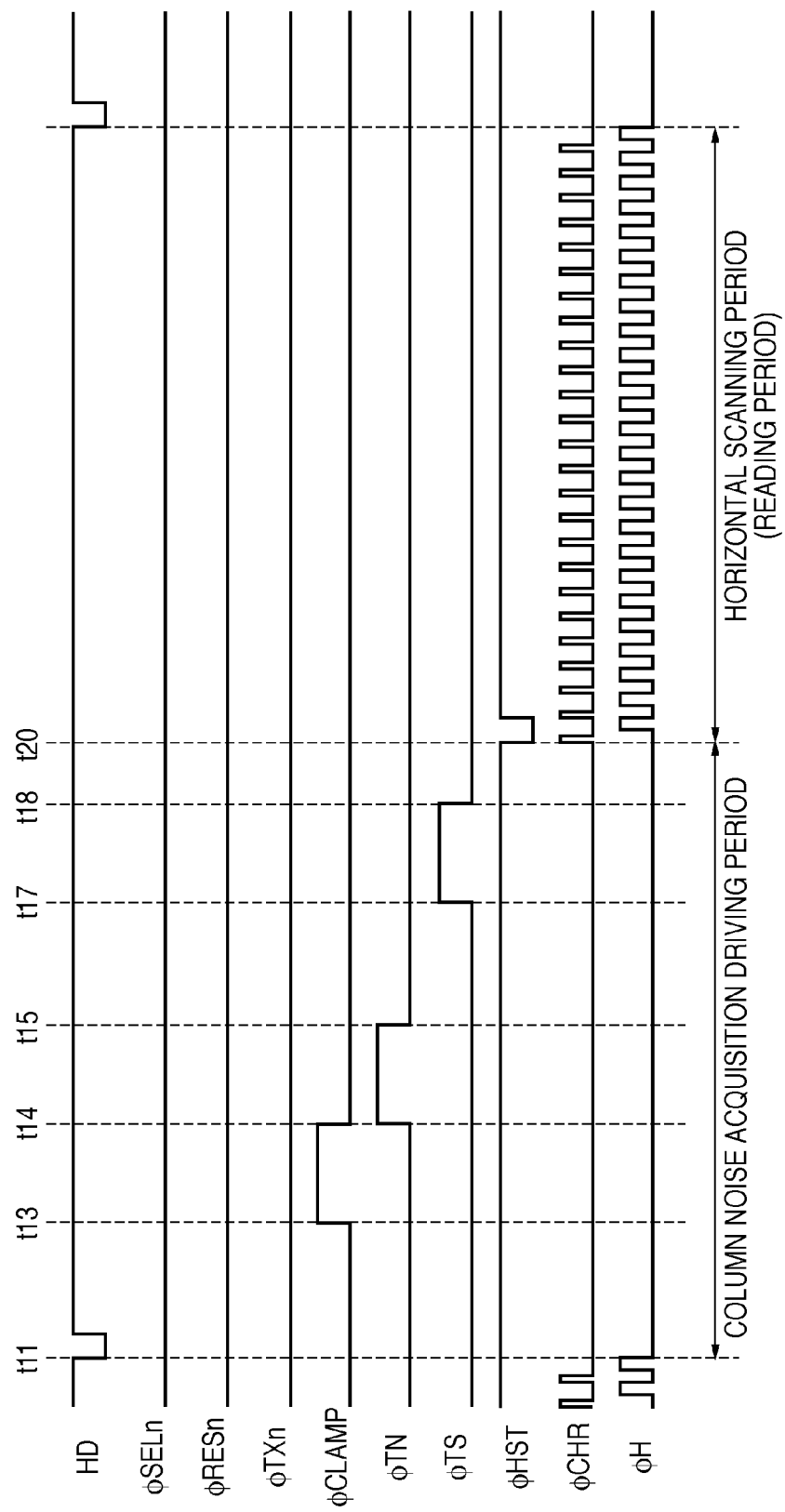
FIG. 8 is a timing chart showing a drive timing example for one horizontal period, in column noise acquisition according to the second embodiment of the present invention.

Next, column noise acquisition operation according to the second embodiment of the present invention will be described with reference to FIGS. 6 and 8. FIG. 8 is a timing chart showing a drive timing example for one horizontal period, in column noise acquisition according to the second embodiment.

In the second embodiment, with the horizontal blanking period from time t11 to time t20 in FIG. 8 as a column noise acquisition driving period, column noise acquisition for one row is carried out within this period. More specifically, the column noise acquisition driving period refers to a period during which column noise signals for one row are, for each column, stored in the transfer capacitors 25 via the column amplifiers 21. During the column noise acquisition driving period, the horizontal scanning clock φH is stopped.

At time t13, the signal φCLAMP goes "H" to turn ON the clamp switches 23, and clamp the signal level of the current vertical output lines 8 in the clamp capacitors 20. At time t14, the signal φCLAMP goes "L" to turn OFF the clamp switches 23, completing the clamping of the signal level of the vertical output lines 8 in the clamp capacitors 20. Furthermore, at time t14, the signal φTN goes "H" to turn ON the transfer gates 28, and noise signals generated in the column amplifiers 21 are thus transferred to the transfer capacitors 29 and stored in the transfer capacitors 29. A time t15, the signal φTN goes "L" to turn OFF the transfer gates 28, completing the storage of noise signals in the transfer capacitors 29.

Then, at time t17, the signal φTS goes "H" to turn ON the transfer gates 24, and the output signals of the column amplifiers 21 are thus transferred to the transfer capacitors 25 and stored in the transfer capacitors 25.

It is to be noted that after the clamping in the clamp capacitors 20 at time t14 is completed, the differential signal between the signal level of the vertical output line 8 clamped during the period from time t13 to time t14 and the signal level of the current vertical output line 8 is amplified and output from the column amplifier 21. As indicated by the signal φSELn in FIG. 7, the signal φSELn is kept at "L" during the column noise acquisition driving period, without connecting the circuits of the pixels 50 to the vertical output lines 8. Therefore, the signal level of the vertical output lines 8 is not changed.

At time t18, the signal φTs goes "L" to turn OFF the transfer gates 24, completing the storage of the output signals of the column amplifiers 21 in the transfer capacitors 25. At time t20, the column noise acquisition driving period is completed, and when the horizontal scanning period is started, the column noise signals for one row are sequentially output for each column from the output amplifier 14A in accordance with the horizontal scanning clocks φH. The signals output from the output amplifier 14A are input to the column noise correction circuit 200 described with reference to FIG. 2. There is no difference between the processing in the column noise correction circuit 200 according to the second embodiment and the processing already described, and the description of the processing is thus omitted here.

As described above, in the case of the second embodiment, column noise caused by the transfer gates 24 and 28, the transfer capacitors 25 and 29, and the transfer gates 26 and 30 can be acquired without the use of a pixel region other than the effective pixel region. Then, correction data can be obtained on the basis of the acquired column noise. Therefore, the correction data can be used to correct column noise caused by the transfer gates 24 and 28, the transfer capacitors 25 and 29, and the transfer gates 26 and 30 in pixel signals.

<Third Embodiment>

Figure 9:
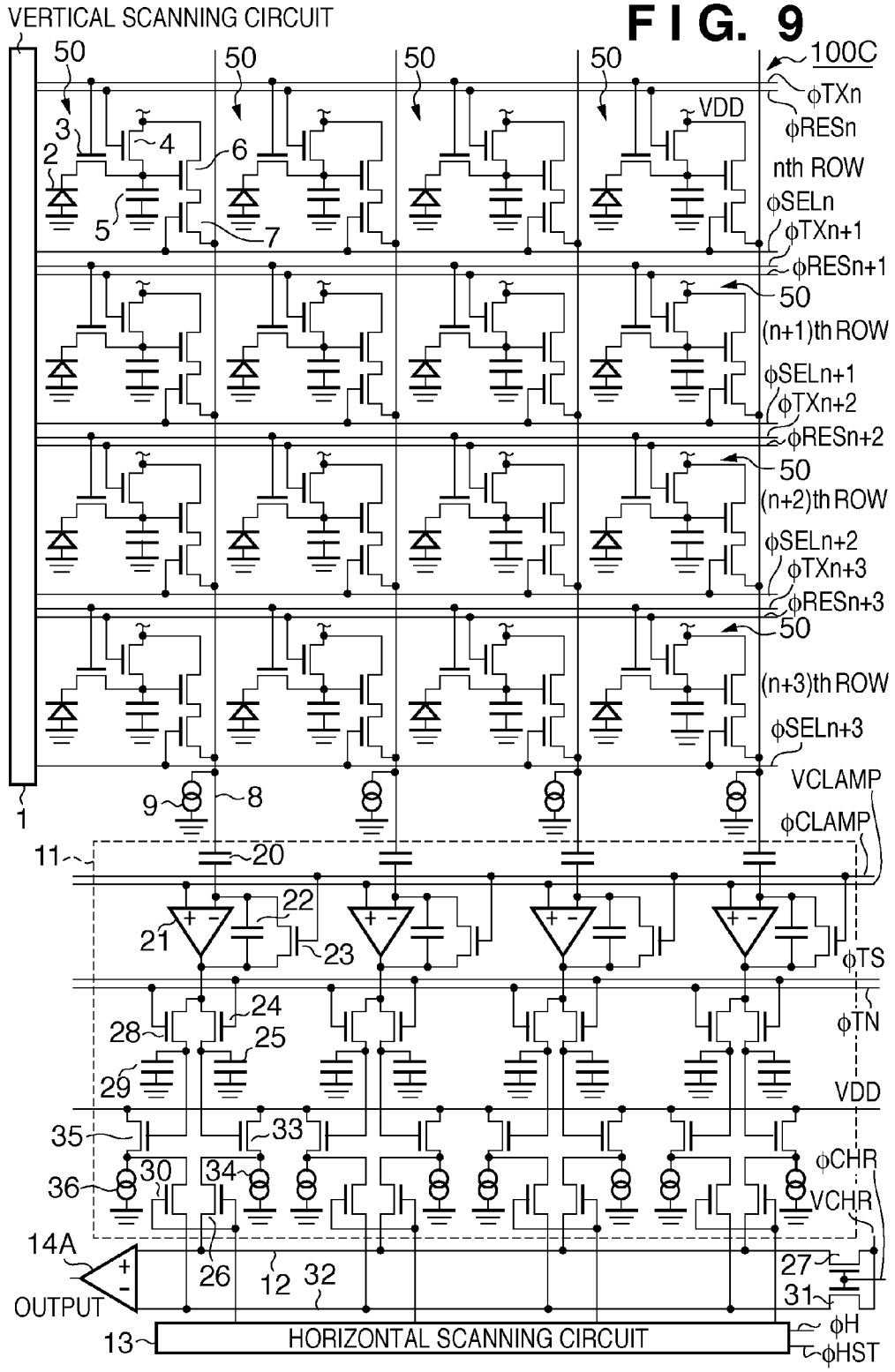
FIG. 9 is a diagram illustrating the configuration of an example of an image sensor according to a third embodiment of the present invention.

Next, an image sensor and a driving method for the image sensor according to a third embodiment of the present invention will be described. The third embodiment provides an example in which column amplifiers and noise removal circuits are applied as the column circuits 10, 10, . . . in the column circuit group 11, and source followers are provided as output buffer amplifiers for transfer capacitors. FIG. 9 shows the configuration of an example of an image sensor 100C according to the third embodiment. It is to be noted that in FIG. 9, elements in common with FIGS. 1 and 6 described above are denoted by the same reference numerals, and detailed description of the elements is omitted.

In FIG. 9, a signal stored in the transfer capacitor 25 is subjected to current amplification in a source follower amplifier 33 driven by a constant current source 34, and output to the horizontal output line 12. Similarly, a signal stored in the transfer capacitor 29 is subjected to current amplification in a source follower amplifier 35 driven by a constant current source 36, and output to the horizontal output line 32. In the image sensor 100c configured as in FIG. 9, the transfer capacitors 25 and 29 can be reduced in capacity, as compared with the above-described image sensor 100B configured as in FIG. 6. Therefore, the image sensor 100C according to the third embodiment can be reduced in area, as compared with the image sensor 100B shown in FIG. 6.

Driving by normal readout and driving during column noise acquisition operation according to the third embodiment are the same as those in the second embodiment described with reference to FIGS. 7 and 8, and thus description thereof is omitted here.

In the case of the third embodiment, column noise caused by the transfer gates 24 and 28, the transfer capacitors 25 and 29, the transfer gates 26 and 30, and the source follower amplifiers 33 and 35 can be acquired without the use of a pixel region other than the effective pixel region. Then, correction data obtained on the basis of the acquired column noise can be used to correct column noise caused by the transfer gates 24 and 28, the transfer capacitors 25 and 29, the transfer gates 26 and 30, and the source follower amplifiers 33 and 35 in pixel signals.

It is to be noted that although simple source follower amplifiers are used as the output buffer amplifiers for the transfer capacitors 25 and 29 in the third embodiment, the third embodiment is not limited thereto and other types of buffer amplifiers may be used.

<Fourth Embodiment>

Next, a fourth embodiment of the present invention will be described. The fourth embodiment provides examples of an image sensor in a case in which column amplifiers and column A/D circuits are applied as the column circuits 10, 10, . . . in the column circuit group 11, and of a driving method for the image sensor. FIG. 10 shows the configuration of an example of an image sensor 100D according to the fourth embodiment. It is to be noted that in FIG. 10, elements in common with FIG. 1 described above are denoted by the same reference numerals, and detailed description of the elements is omitted.

The output from the column amplifier 21 in each column is respectively input to the column A/D circuit 37. In this example, the column A/D circuit 37, which has a ramp-type configuration, has voltage comparators 38 and counters 41 for each column, and has a counter 39 and a D/A circuit 40. The counter 39 counts input clock signals φADCLK. The count value of the counter 39 is converted to a voltage value in the D/A circuit 40, and the voltage value is input to one input terminal of each voltage comparator 38. The output of each column amplifier 21 is input to the other input terminal of each voltage comparator 38. The counters 41 stop or keep counting clock signals φADCLK, in response to changes in the output of the voltage comparators 38.

The operation of the column A/D circuit 37 will be described. The counter 39 and the D/A circuit 40 generate a ramp waveform, and this ramp waveform is input to one input terminal of the voltage comparators 38. The voltage comparators 38 compare the ramp waveform input to the input terminal with the output of the column amplifiers 21 input to the other input terminal, and change their output when the voltages input to the two input terminals coincide with each other. The counters 41 stop counting clock signals φADCLK in response to changes in the output of the voltage comparators 38, and hold the count rate at the time of stopping the counting. This operation applies A/D conversion to the output signals of the column amplifiers 21, with the digital values of the output signals of the column amplifiers 21 held in the counters 41.

The horizontal scanning circuit 13 sequentially selects the counters 41, 41, . . . in accordance with the horizontal scanning clocks ϕH. The counter 41 selected by the horizontal scanning circuit 13 outputs the held digital value to a digital signal output line 42. The digital value output to the digital signal output line 42 is output to the outside of the image sensor 100D via an output buffer 43.

Figure 11:
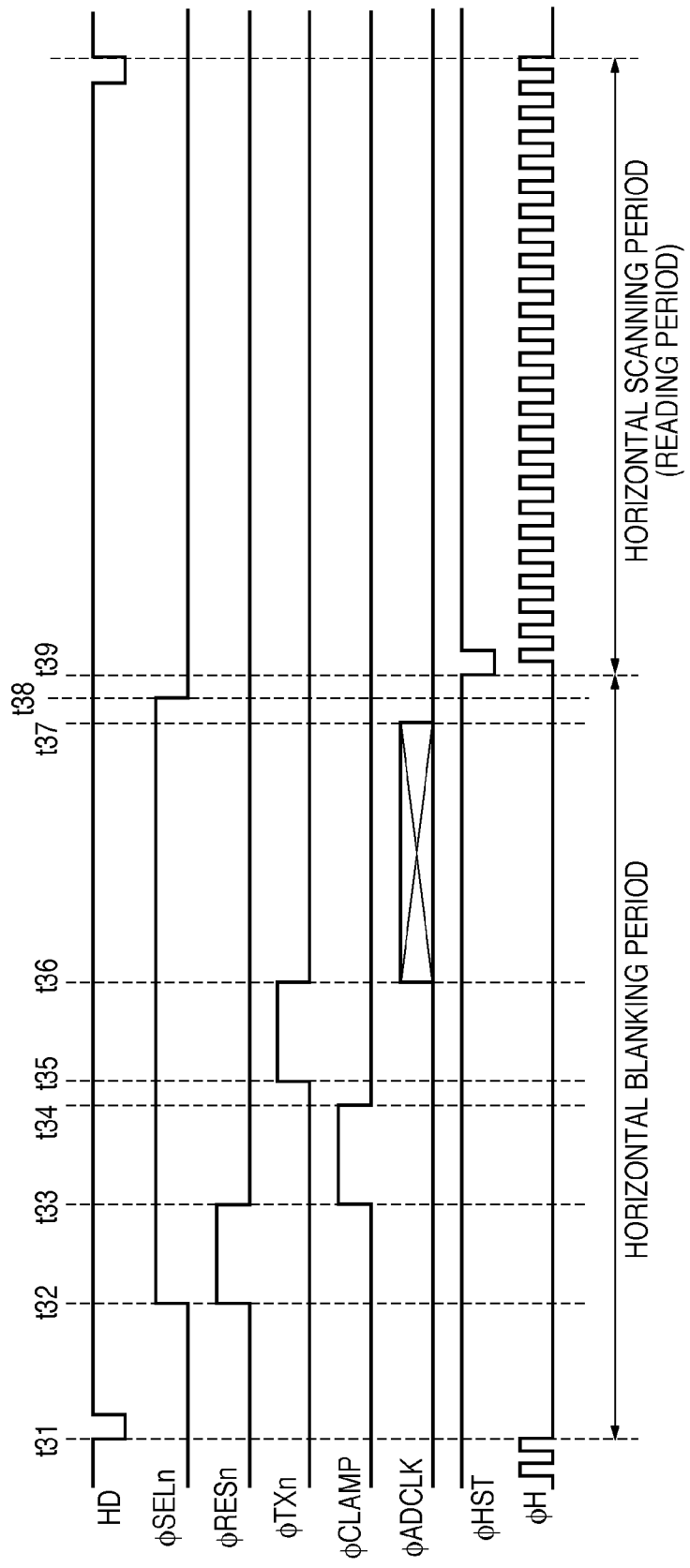
FIG. 11 is a timing chart showing a drive timing example for one horizontal period in the case of reading out electrical charges from pixels by normal readout, according to the fourth embodiment of the present invention.

FIG. 11 is a timing chart showing a drive timing example for one horizontal period in the case of reading out electrical charges by normal readout from pixels 50, 50, . . . , in the configuration of FIG. 10.

A signal HD indicates the beginning of one horizontal period, and a signal ϕHST indicates the start of a horizontal scanning period, that is, the start of reading out from the pixels 50, 50, . . . in the horizontal direction. The period from time t31 at which the signal HD goes "L" to time t39 at which the signal ϕHST goes "L" refers to a horizontal blanking period. During the horizontal blanking period, signals for one row read out from the pixels 50, 50, . . . are transferred to the voltage comparators 38 via the column amplifiers 21. During the horizontal blanking period, the horizontal scanning clock ϕH is stopped.

At time t32, a signal ϕSELn goes "H" to turn ON the row selection switches 7, thereby connecting the circuits in the nth row pixels 50 to the vertical output lines 8. Furthermore, at time t32, a signal ϕRESn goes "H" to turn ON the reset switches 4, thereby resetting unneeded charges accumulated in the accumulation capacitors 5. At time t33, the signal ϕRESn goes "L" to complete the resetting, and a signal ϕCLAMP goes "H" to turn ON the clamp switches 23, thereby clamping noise components generated in the pixels 50 in the clamp capacitors 20 connected to the vertical output lines 8. At time t34, the signal ϕCLAMP goes "L" to turn OFF the clamp switches 23, thereby completing the clamping of noise components generated in the pixels 50 in the clamp capacitors 20.

At time t35, a signal ϕTXn goes "H" to turn ON the transfer switches 3, thereby transferring the signal charges accumulated in the photodiodes 2 to the accumulation capacitors 5. At time t36, the signal ϕADCLK is input to the column A/D circuit 37 to start A/D conversion operation in the column A/D circuit 37. At time t37, the signal ϕADCLK is stopped, thereby A/D conversion operation in the column A/D circuit 37 ends. Then, at time t38, the signal ϕSELn goes "L" to turn OFF the row selection switches 7.

Subsequently, from time t39, one horizontal scanning period is started for the nth row digital signals. In one horizontal scanning period, input of horizontal scanning clocks ϕH to the horizontal scanning circuit 13 is started. The horizontal scanning circuit 13 sequentially selects the counters 41 in accordance with the horizontal scanning clocks ϕH. The output of the counter 41 in the selected column is output to the digital signal output lines 42, and output to the outside of the image sensor 100D via the output buffer 43.

Figure 12:
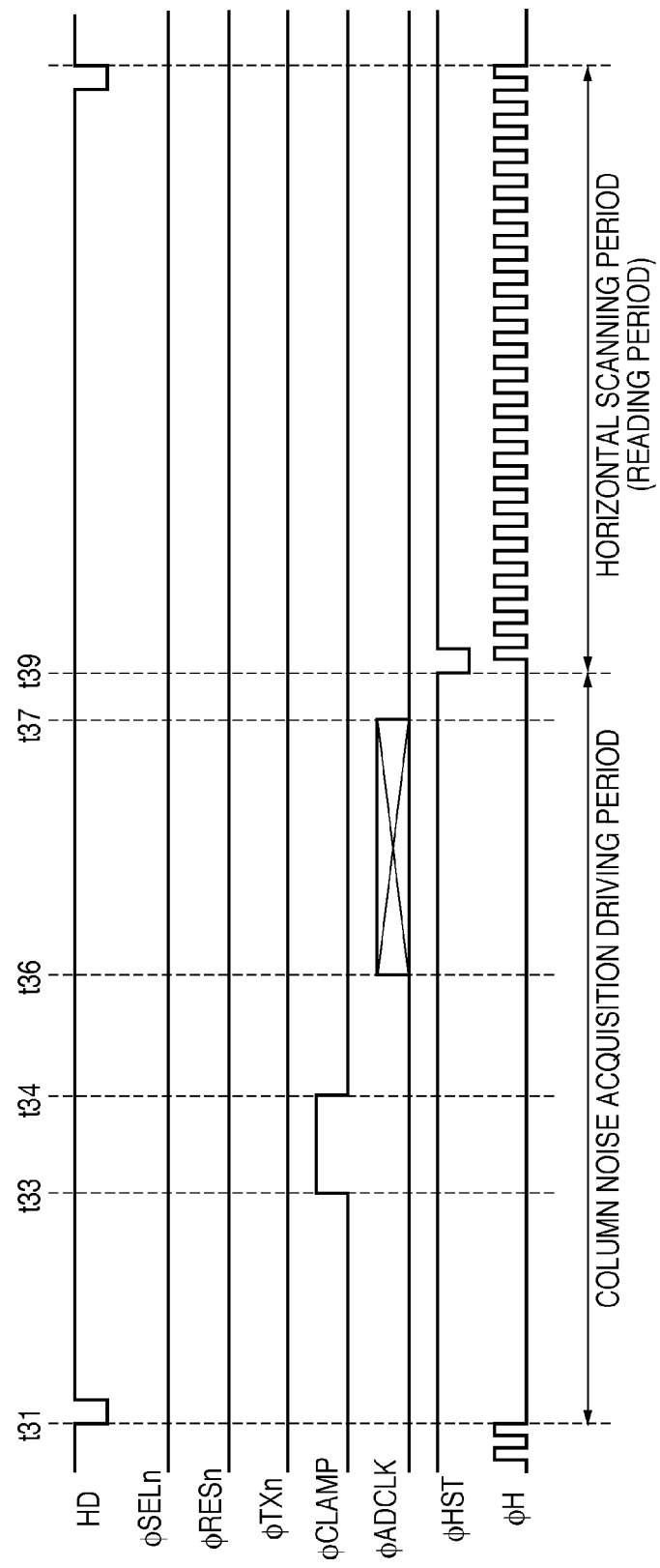
FIG. 12 is a timing chart showing a drive timing example for one horizontal period, in column noise acquisition according to the fourth embodiment of the present invention.

Next, column noise acquisition operation according to the fourth embodiment of the present invention will be described with reference to FIGS. 10 and 12. FIG. 12 is a timing chart showing a drive timing example for one horizontal period, in column noise acquisition according to the fourth embodiment.

In the fourth embodiment, with the horizontal blanking period from time t31 to time t39 in FIG. 12 as a column noise acquisition driving period, column noise acquisition for one row is carried out within the period. More specifically, the column noise acquisition driving period refers to a period during which column noise signals for one row are, for each column, converted to digital values in the column A/D circuit 37 via the column amplifiers 21, and the digital values are held in the counters 41. During the column noise acquisition driving period, the horizontal scanning clock ϕH is stopped.

At time t33, the signal ϕCLAMP goes "H" to turn ON the clamp switches 23, and clamp the signal level of the current vertical output line 8 in the clamp capacitor 20. At time t34, the signal ϕCLAMP goes "L" to turn OFF the clamp switches 23, thereby completing the clamping of noise components generated in the pixels 50 in the clamp capacitors 20. At time t36, the signal ϕADCLK is input to the column A/D circuit 37 to start A/D conversion operation in the column A/D circuit 37. This A/D conversion operation converts the output signals of the column amplifiers 21, 21, . . . in each column to digital values, and the digital values are held in the respective counters 41, 41, . . . . . At time t37, the signal ϕADCLK is stopped to complete the A/D conversion operation in the column A/D circuit 37.

It is to be noted that after the clamping in the clamp capacitors 20 at time t34 is completed, the differential signal between the signal level of the vertical output line 8 clamped during the period from time t33 to time t34 and the signal level of the current vertical output line 8 is amplified and output from the column amplifier 21. As indicated by the signal ϕSELn in FIG. 12, the signal ϕSELn is kept at "L" during the column noise acquisition driving period, without connecting the circuits of the pixels 50 to the vertical output lines 8. Therefore, the signal level of the vertical output lines 8 is not changed.

Subsequently, from time t39, one horizontal scanning period is started for the nth row digital signals. In one horizontal scanning period, input of horizontal scanning clocks ϕH to the horizontal scanning circuit 13 is started. The horizontal scanning circuit 13 sequentially selects the counters 41 in accordance with the horizontal scanning clocks ϕH. The output of the counter 41 in the selected column is output to the digital signal output line 42, and supplied to the output buffer 43.

The output of the output buffer 43 is input to the column noise correction circuit 200 described with reference to FIG. 2. It is to be noted that the output of the image sensor 100D is converted in advance to a digital signal in the column A/D circuit 37 in the fourth embodiment. Therefore, the A/D conversion unit 202 in the column noise correction circuit 200 is omitted. There is no difference between the processing in the correction processing circuit 203 according to the fourth embodiment and the processing already described, and the description of the processing is thus omitted here.

As described above, in the case of the fourth embodiment, column noise generated in the column amplifiers 21 and column noise caused by the column A/D circuit 37 can be acquired without the use of a pixel region other than the effective pixel region. Then, correction data can be obtained on the basis of the acquired column noise. Therefore, the correction data can be used to correct column noise generated in the column amplifiers 21 and column noise caused by the column A/D circuit 37 in pixel signals.

<Fifth Embodiment>

Next, examples of an image sensor and of a driving method for the image sensor according to a fifth embodiment of the present invention will be described. The fifth embodiment provides an example in which a driving method for column noise acquisition is different from that in the first embodiment while the image sensor 100A described in the first embodiment is used. It is to be noted that the drive timing for reading out charges by normal readout from the pixels 50, 50, . . . in the fifth embodiment is the same as the driving timing for normal readout in the first embodiment as described with reference to FIG. 4, and the description of the drive timing is omitted here.

In the first embodiment described above, the circuits of the pixels 50, 50, . . . are not connected to the vertical output lines 8 in the column noise acquisition driving period, so as not to drive the circuits in each of the pixels 50, 50, . . . . By contrast, in the fifth embodiment, the circuits of the pixels 50, 50, . . . are connected to the vertical output lines 8 to drive the circuits in each of the pixels 50, 50, . . . in the column noise acquisition driving period. In this case, the circuits are driven so as not to transfer signal charges accumulated in the photodiodes 2 to the accumulation capacitors 5.

Figure 13:
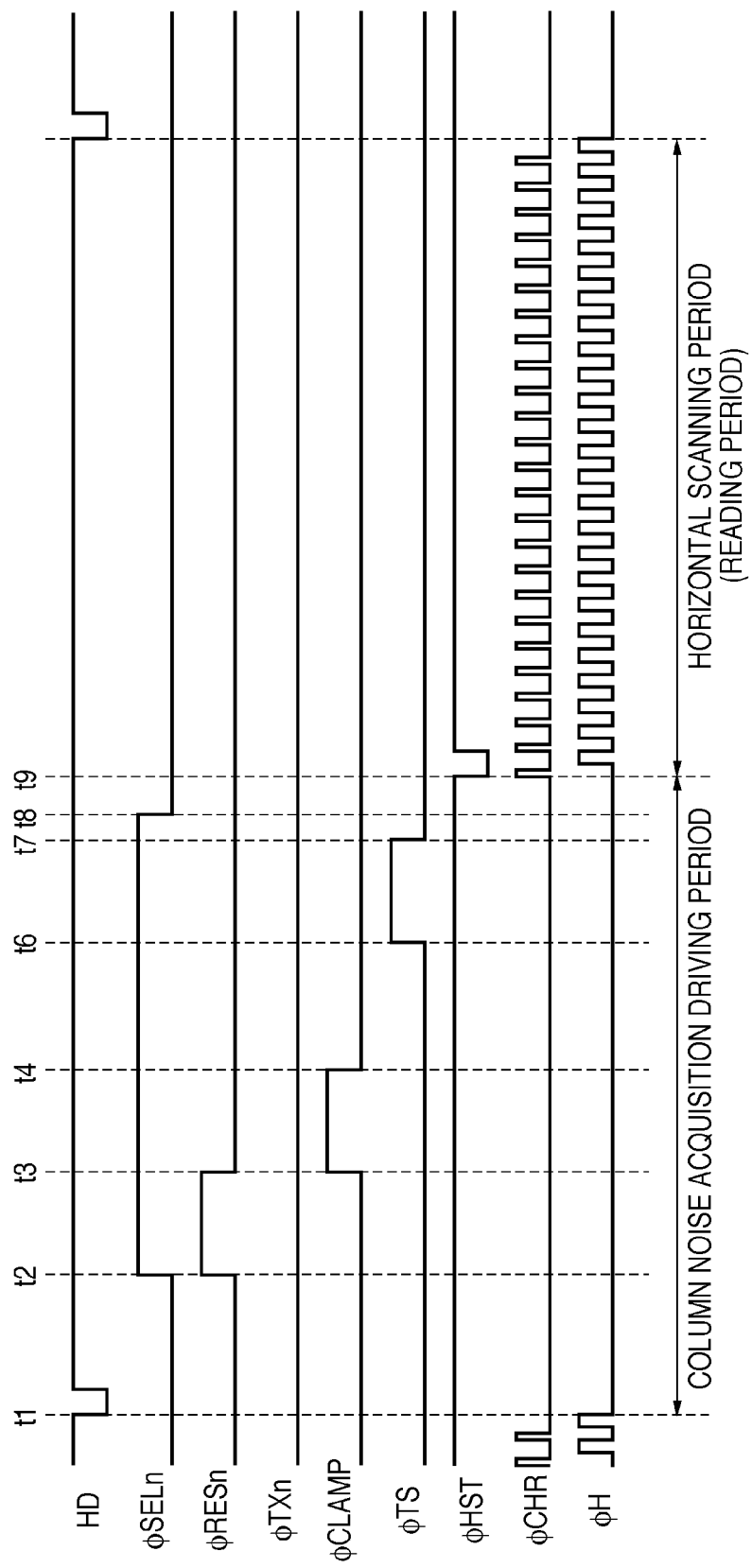
FIG. 13 is a timing chart showing a drive timing example for one horizontal period, in column noise acquisition according to a fifth embodiment of the present invention.

FIG. 13 is a timing chart showing a drive timing example for one horizontal period, in column noise acquisition according to the fifth embodiment.

In the fifth embodiment, in the same way as in the case of the first embodiment described with reference to FIG. 5, with the horizontal blanking period from time t1 to time t9 in FIG. 13 as a column noise acquisition driving period, column noise acquisition for one row is carried out within this period. More specifically, the column noise acquisition driving period refers to a period during which column noise signals for one row are, for each column, stored in the transfer capacitors 25 via the column amplifiers 21. During the column noise acquisition driving period, the horizontal scanning clock φH is stopped.

At time t2, a signal φSELn goes "H" to turn ON the selection switches 7 and thus connect the circuits in the nth row pixels 50 to the vertical output lines 8, and to turn ON the reset switches 4 and thus reset unneeded charges accumulated the accumulation capacitors 5. At time t3, a signal φRESn goes "L" to turn OFF the reset switches 4, thus completing the resetting.

Furthermore, at time t3, a signal φCLAMP goes "H" to turn ON the clamp switches 23, thereby clamping noise components generated in the pixels 50 in the clamp capacitors 20 connected to the vertical output lines 8. At time t4, the relevant signal φCLAMP goes "L" to turn OFF the clamp switches 23, thus completing the clamping of noise components generated in the pixels 50 into the clamp capacitors 20.

At time t6, a signal φTS goes "H" to turn ON the transfer gates 24. When the transfer gates 24 are turned ON, the signal charges of the accumulation capacitors 5 in the pixels 50 are amplified and converted to voltages by the source follower amplifiers 6, and output to the vertical output lines 8. The signals output to the vertical output lines 8 are transferred to the transfer capacitors 25 via the corresponding clamp capacitors 20 and column amplifiers 21, and stored in the transfer capacitors 25.

It is to be noted that after the clamping at time t4 described above is completed, the differential signal between the signal input to the clamp capacitor 20 from the vertical output line 8 and the noise component clamped in the clamp capacitor 20 during the period from time t3 to time t4 is amplified and output from the column amplifier 21. As indicated by a signal φTXn in FIG. 13, the signal φTXn is kept at "L" during the column noise acquisition driving period, and the charges of the photodiodes 2 are not transferred to the accumulation capacitors 5. Therefore, the signal level of the vertical output lines 8 is not changed.

At time t7, the signal φTS goes "L" to turn OFF the transfer gates 24, completing the storage in the transfer capacitors 25. Then, at time t8, the signal φSELn goes "L" to turn OFF the row selection switches 7.

From time t9, one horizontal scanning period is started for the nth row signals. In one horizontal scanning period, input of horizontal scanning clocks φH to the horizontal scanning circuit 13 is started. The horizontal scanning circuit 13 sequentially turns on the transfer gates 26 in accordance with the horizontal scanning clocks φH, and the signals stored in the transfer capacitors 25 connected to the transfer gates 26 turned ON are sequentially output to the horizontal output line 12, and the noise signals for one row are output from the output amplifier 14.

It is to be noted that the horizontal output line 12 has a horizontal output line reset switch 27 whose ON/OFF is controlled in accordance with a signal φCHR and which is reset to a voltage VCHR for each horizontal scanning clock φH.

As described above, also in the fifth embodiment in the same way as in the first embodiment described above, column noise generated in the column amplifiers 21 and column noise caused by the transfer gates 24, the transfer capacitors 25, and the transfer gates 26 can be acquired without the use of a pixel region other than the effective pixel region. Then, correction data can be obtained on the basis of the acquired column noise. Therefore, the correction data can be used to correct column noise generated in the column amplifiers 21 and column noise caused by the transfer gates 24, the transfer capacitors 25, and the transfer gates 26 in pixel signals.

<Sixth Embodiment>

Figure 14:
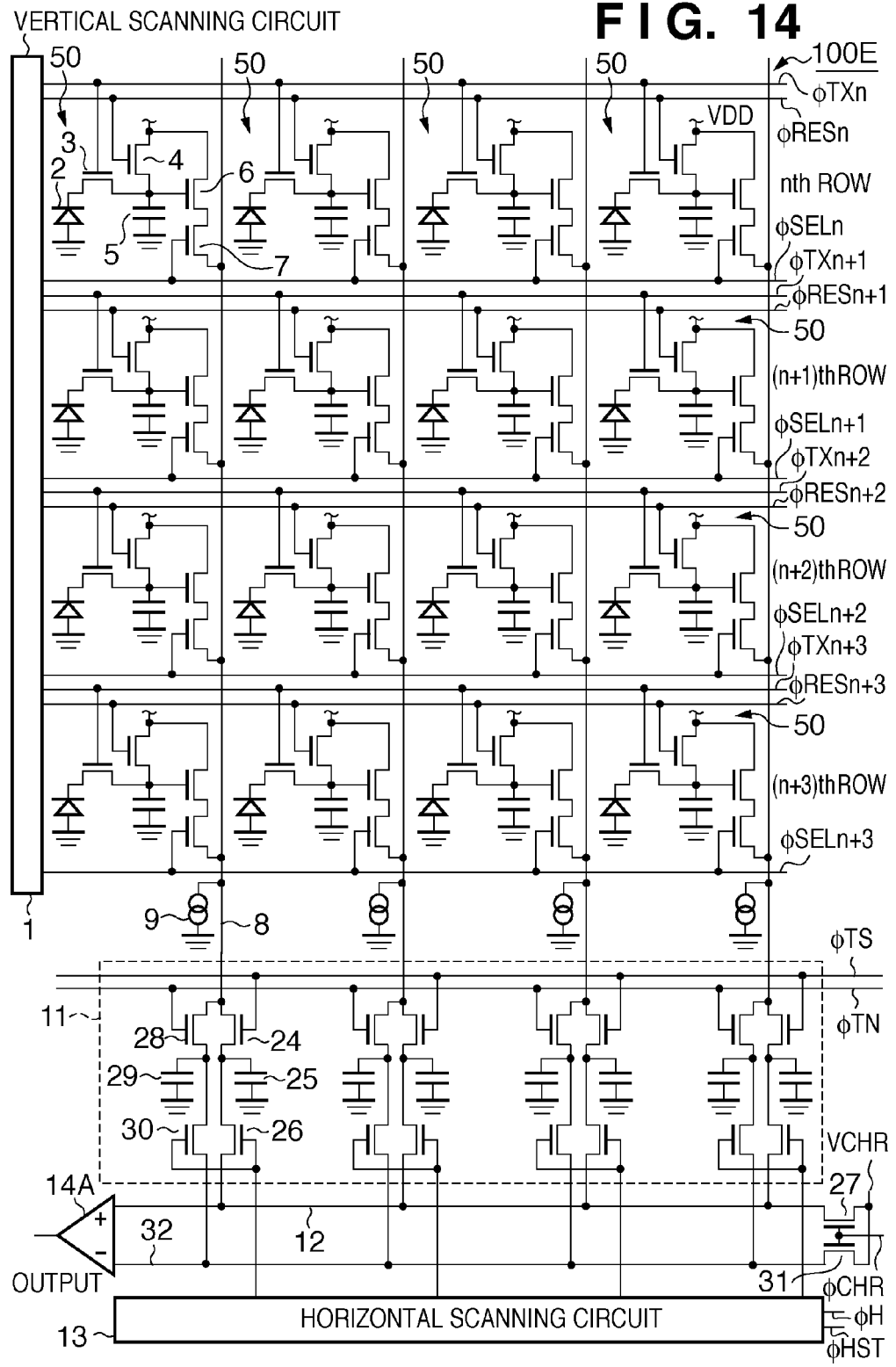
FIG. 14 is a diagram illustrating the configuration of an example of an image sensor according to a sixth embodiment of the present invention.

Next, examples of an image sensor and of a driving method for the image sensor according to a sixth embodiment of the present invention will be described. FIG. 14 shows the configuration of an example of an image sensor 100E according to which the sixth embodiment. It is to be noted that in FIG. 14, elements in common with FIG. 6 described above are denoted by the same reference numerals, and detailed description of the elements is omitted.

As shown in FIG. 14, in the image sensor 100E according to the sixth embodiment, the clamp capacitor 20, the column amplifier 21, the feedback capacitor 22, and the clamp switch 23 are omitted in each column, as compared to the image sensor 100B according to the second embodiment described with reference to FIG. 6. In other words, in the image sensor 100E, the output of the vertical output line 8 is supplied directly to each of the transfer gates 24 and 28 in each column.

Figure 15:
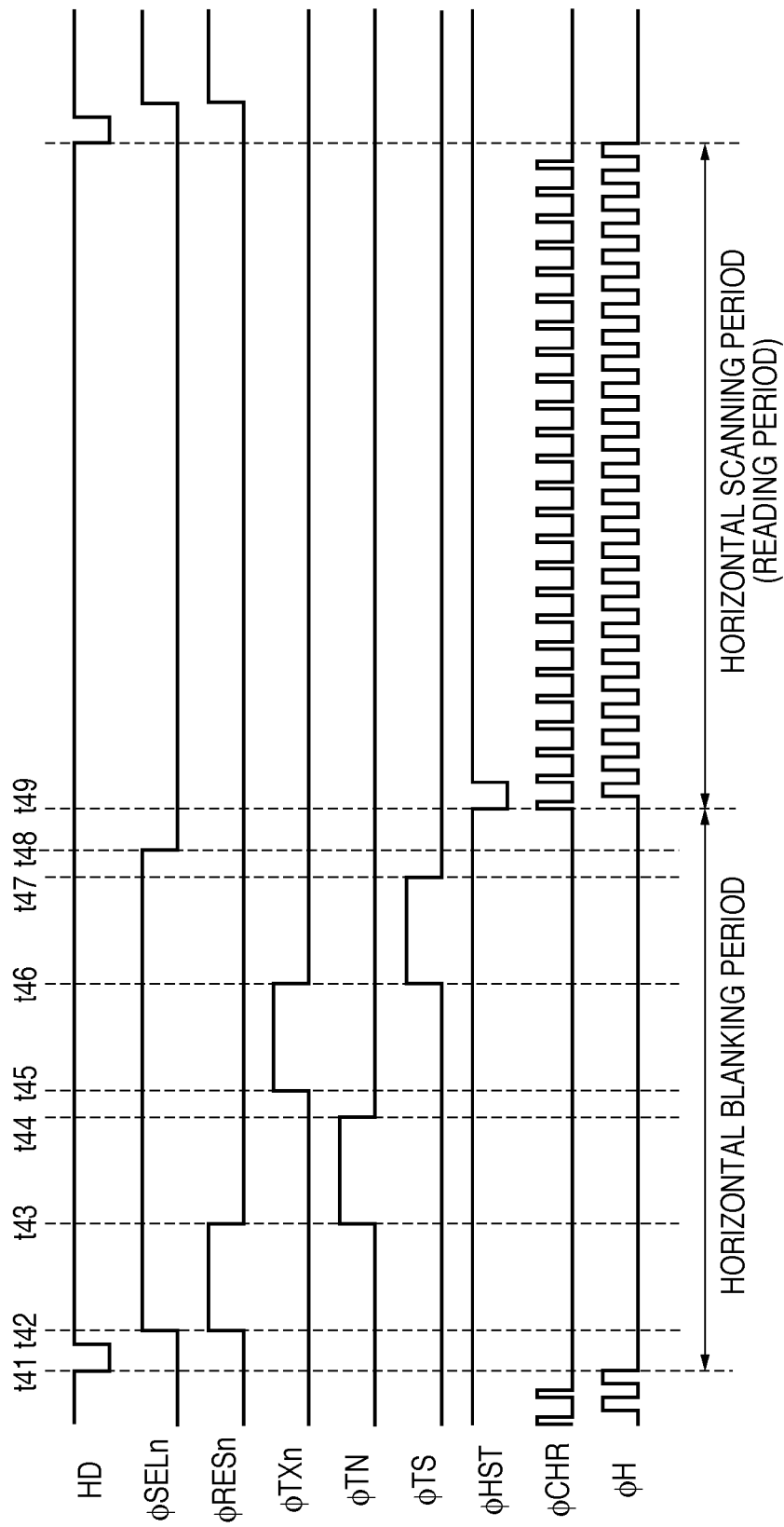
FIG. 15 is a timing chart showing a drive timing example for one horizontal period in the case of reading out electrical charges from pixels by normal readout, according to the sixth embodiment of the present invention.

FIG. 15 is a timing chart showing a drive timing example for one horizontal period in the case of reading out electrical charges by normal readout from pixels 50, 50, . . . , in the configuration of FIG. 14.

A signal HD indicates the beginning of one horizontal period, and a signal φHST indicates the start of a horizontal scanning period, that is, the start of reading out in the horizontal direction from the pixels 50, 50, . . . . The period from time t41 at which the signal HD goes "L" to time t49 at which the signal φHST goes "L" refers to a horizontal blanking period. During the horizontal blanking period, signals for one row read out from the pixels 50, 50, . . . are transferred to the transfer capacitors 25 via the transfer gates 24, and stored in the transfer capacitors 25. During the horizontal blanking period, the horizontal scanning clock φH is stopped.

At time t42, a signal φSEL goes "H" to turn ON the row selection switches 7, thereby connecting the circuits in the nth row pixels 50 to the vertical output lines 8, and turn ON the reset switches 4, thereby resetting unneeded charges accumulated in the accumulation capacitors 5. At time t43, a signal φRESn goes "L" to turn OFF the reset switches 4, thereby completing the resetting.

At time t43, a signal φTN goes "H" to turn ON the transfer gates 28, and noise components generated in each of the pixels 50 are thus transferred to the transfer capacitors 29 via the transfer gates 28, and stored in the transfer capacitors 29. A time t44, the signal φTN goes "L" to complete the storage of noise components generated in each of the pixels 50 in the transfer capacitors 29.

At time t45, a signal φTXn goes "H" to turn ON the transfer switches 3, transferring signal charges accumulated in the photodiodes 2 to the accumulation capacitors 5. At time t46, the signal φTXn goes "L" to turn OFF the transfer switches 3, completing the transfer of signal charges to the accumulation capacitors 5, and the signal φTS goes "H" to turn ON the transfer gates 24. When the transfer gates 24 are turned ON, the signal charges of the accumulation capacitors 5 in the pixels 50 are amplified and converted to voltages by the source follower amplifiers 6 and the voltages are output to the vertical output lines 8. The signals output to the vertical output lines 8 are transferred to the transfer capacitors 25 via the transfer gates 24, and stored in the transfer capacitors 25.

At time t47, a signal φTS goes "L" to complete the storage of the signals output from the vertical output lines 8 in the transfer capacitors 25. Then, at time t48, the signal φSELn goes "L" to turn OFF the row selection switches 7.

Subsequently, from time t49, one horizontal scanning period is started for the nth row signals. In one horizontal scanning period, input of horizontal scanning clocks φH to the horizontal scanning circuit 13 is started. The horizontal scanning circuit 13 sequentially turns on the transfer gates 26 and 30 in accordance with the horizontal scanning clocks φH. The image signals stored in the transfer capacitors 25 connected to the transfer gates 26 turned ON are sequentially output to the horizontal output line 12. Furthermore, the noise signals stored in the transfer capacitors 29 connected to the transfer gates 30 turned ON are sequentially output to the horizontal output line 32. In the output amplifier 14A, the noise signals input from the horizontal output line 32 are subtracted from the shot image signals input from the horizontal output line 12, and the image signals from which the noise signals are subtracted are output as image signals for one row.

It is to be noted that the horizontal output lines 12 and 32 are connected to horizontal output line reset switches 27 and 31 whose ON/OFF are controlled in accordance with a signal φCHR and which are reset to a voltage VCHR for each horizontal scanning clock φH.

Figure 16:
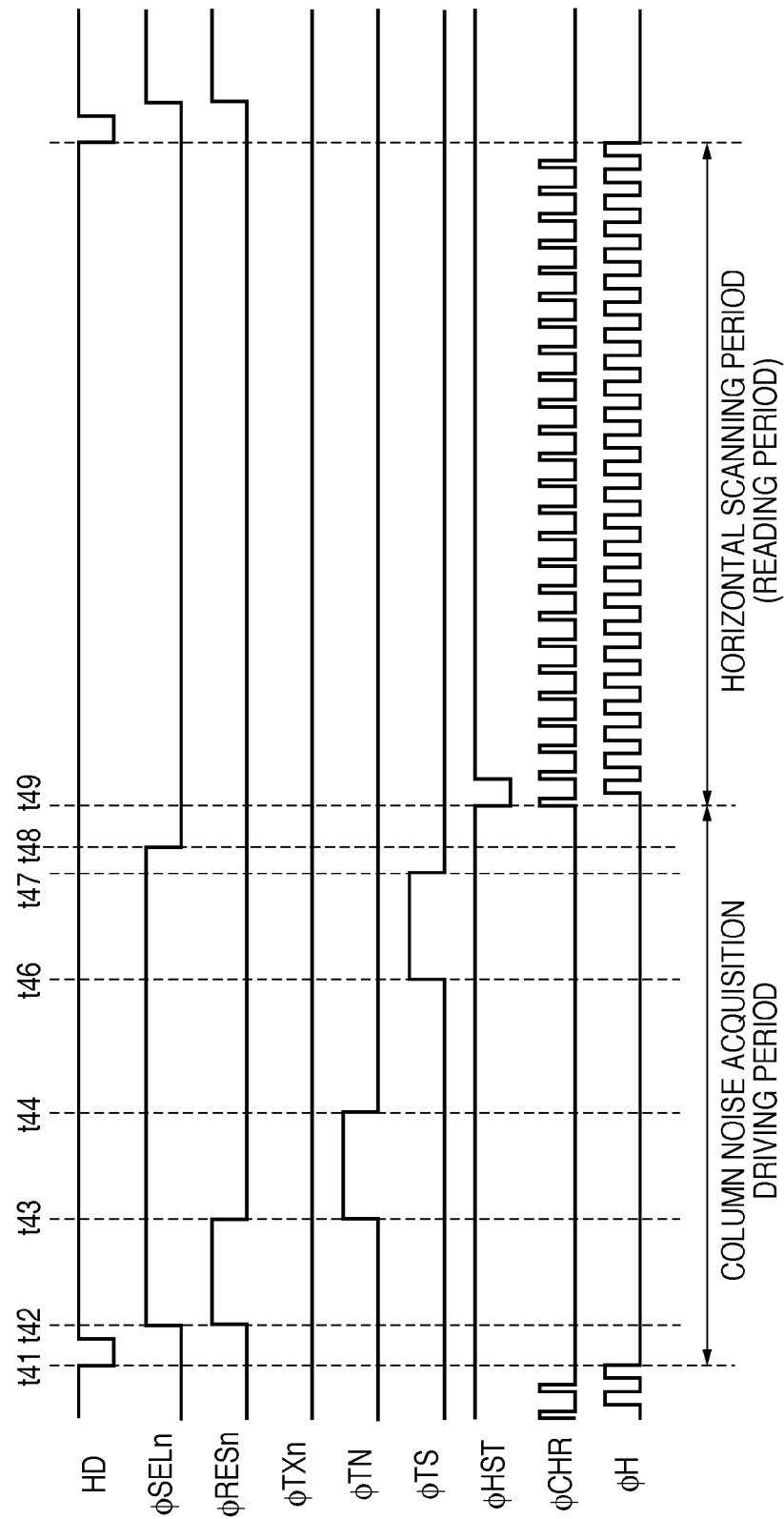
FIG. 16 is a timing chart showing a drive timing example for one horizontal period, in column noise acquisition according to the sixth embodiment of the present invention.

Next, column noise acquisition operation according to the sixth embodiment of the present invention will be described with reference to FIGS. 14 and 16. FIG. 16 is a timing chart showing a drive timing example for one horizontal period, in column noise acquisition according to the sixth embodiment.

In the sixth embodiment, with the horizontal blanking period from time t41 to time t49 in FIG. 16 as a column noise acquisition driving period, column noise acquisition for one row is carried out within this period. More specifically, the column noise acquisition driving period refers to a period during which column noise signals for one row are, for each column, stored in the transfer capacitors 25 via the transfer gates 24. During the column noise acquisition driving period, the horizontal scanning clock φH is stopped.

At time t42, the signal φSEL goes "H" to turn ON the row selection switches 7, thereby connecting the circuits in the nth row pixels 50 to the vertical output lines 8, and turn ON the reset switches 4, thereby resetting unneeded charges accumulated in the accumulation capacitors 5. At time t43, a signal φRESn goes "L" to turn OFF the reset switches 4, thereby completing the resetting.

At time t43, the signal φTN goes "H" to turn ON the transfer gates 28, and noise components generated in each of the pixels 50 are thus transferred to the transfer capacitors 29, and stored in the transfer capacitors 29. A time t44, the signal φTN goes "L" to complete the storage of noise signals generated in each of the pixels 50 in the transfer capacitors 29.

At time t46, the signal φTS goes "H" to turn ON the transfer gates 24. When the transfer gates 24 are turned ON, the signal charges of the accumulation capacitors 5 in the pixels 50 are amplified and converted to voltages by the source follower amplifiers 6 and the voltages output to the vertical output lines 8. The signals output to the vertical output lines 8 are transferred to the transfer capacitors 25 via the corresponding transfer gates 24, and stored in the transfer capacitors 25.

At time t47, a signal φTS goes "L" to complete the storage of the signals output from the vertical output lines 8 in the transfer capacitors 25. Then, at time t8, the signal φSELn goes "L" to turn OFF the row selection switches 7.

Subsequently, from time t49, one horizontal scanning period is started for the nth row signals. In one horizontal scanning period, input of horizontal scanning clocks φH to the horizontal scanning circuit 13 is started. The horizontal scanning circuit 13 sequentially turns on the transfer gates 26 and 30 in accordance with the horizontal scanning clocks φH. The signals stored in the transfer capacitors 25 connected to the transfer gates 26 turned ON are sequentially output to the horizontal output line 12. Furthermore, the noise signals stored in the transfer capacitors 29 connected to the transfer gates 30 turned ON are sequentially output to the horizontal output line 32. In the output amplifier 14A, the noise signals input from the horizontal output line 32 are subtracted from the image signals input from the horizontal output line 12, and the image signals from which the noise signals are subtracted are output as column noise signals for one row.

It is to be noted that the horizontal output lines 12 and 32 are connected to horizontal output line reset switches 27 and 31 whose ON/OFF are controlled in accordance with a signal φCHR and which are reset to a voltage VCHR for each horizontal scanning clock φH.

It is to be noted that, as indicated by the signal φTXn in FIG. 13, the signal φTXn is kept at "L" during the column noise acquisition driving period, and the charges of the photodiodes 2 are not transferred to the accumulation capacitors 5. Therefore, the signal level of the vertical output lines 8 is not changed. Therefore, in the case of the sixth embodiment, column noise caused by the transfer gates 24 and 28, the transfer capacitors 25 and 29, and the transfer gates 26 and 30 can be acquired without the use of a pixel region other than the effective pixel region. Then, correction data can be obtained on the basis of the acquired column noise, and the correction data can be used to correct column noise caused by the transfer gates 24 and 28, the transfer capacitors 25 and 29, and the transfer gates 26 and 30 in pixel signals.

<Seventh Embodiment>

Figure 17:
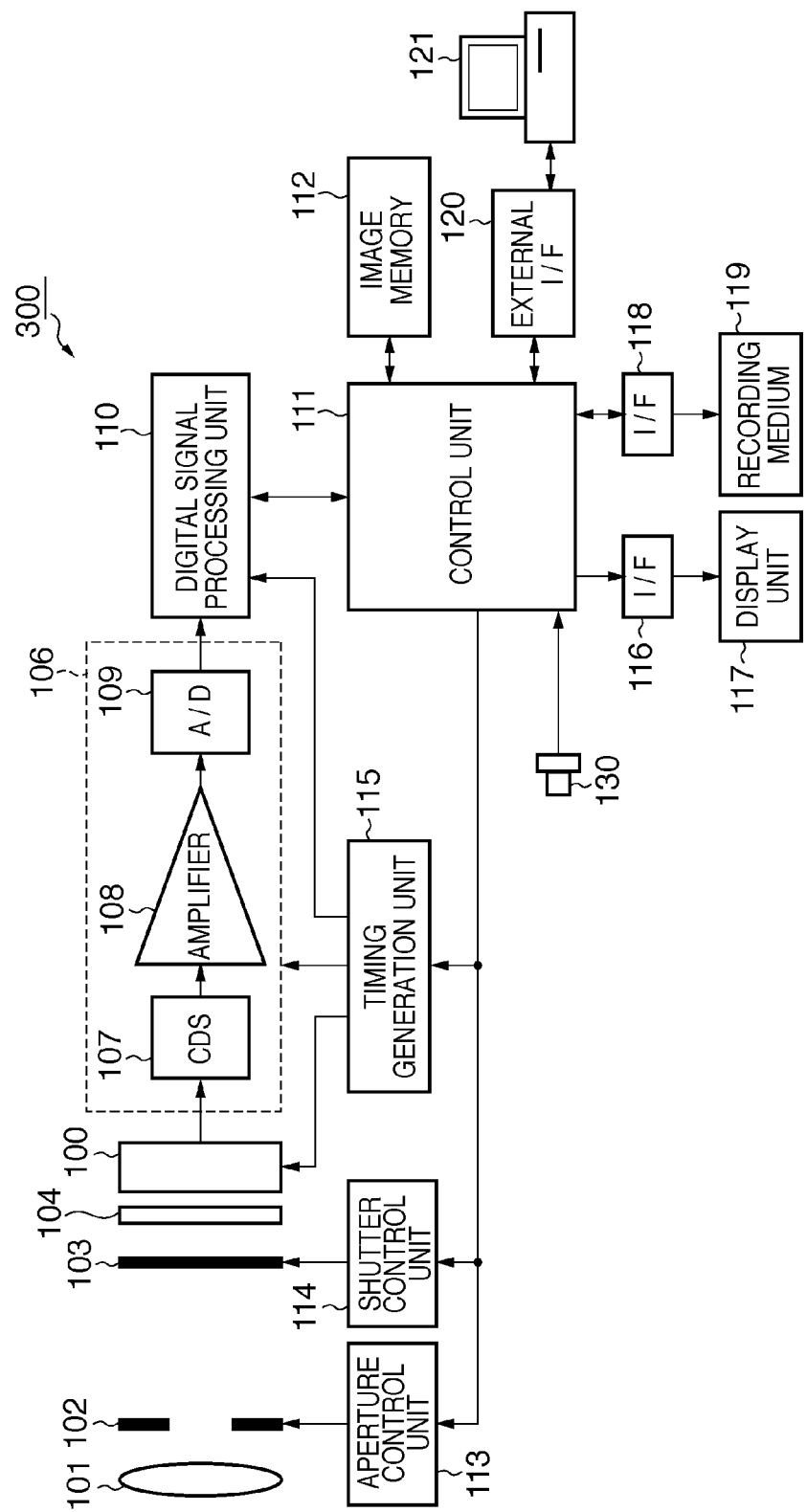
FIG. 17 is a block diagram illustrating the configuration of an example of an image sensing apparatus according to a seventh embodiment of the present invention.

Next, a seventh embodiment of the present invention will be described. The seventh embodiment provides examples in which the image sensors 100A to 100E and the driving methods for each of the image sensors according to each of the embodiments described above are applied to an image sensing apparatus. FIG. 17 shows the configuration of an example of an image sensing apparatus 300 according to the seventh embodiment of the present invention. It is to be noted that a description will be given below with the image sensors 100A to 100E according to each of the embodiments represented by an image sensor 100, unless otherwise specifically noted.

A lens 101 forms an optical image of a subject on the image sensor 100. Light entering the image sensor 100 through the lens 101 can be varied in its amount at an aperture 102 in accordance with control exercised by an aperture control unit 113. Furthermore, the time required for light to enter the image sensor 100 is controlled by a shutter 103 composed of a mechanical shutter in accordance with control exercised by a shutter control unit 114. An optical filter 104 is provided for limiting the wavelength or spatial frequency of the light entering the image sensor 100.

Image signals output from the image sensor 100 are supplied to an analog front end unit 106. The analog front end unit 106 includes a CDS circuit 107 for removing noise of the supplied image signals, an amplifier 108 for adjusting signal gain, and an A/D converter 109 for converting analog signals into digital signals. An image signal is subjected to noise removal processing and signal gain adjustment and converted to a digital signal in the analog front end unit 106, and the digital signal is output. It is to be noted that the A/D converter 109 can be used as the A/D conversion unit 202 described with reference to FIG. 2.

Digital image data output from the analog front end unit 106 is supplied to a digital signal processing unit 110. The digital signal processing unit 110 also includes the correction processing circuit 203 in the column noise correction circuit 200 described with reference to FIG. 2. The digital signal processing unit 110 applies column noise correction processing by the correction processing circuit 203 to the image data supplied from the analog front end unit 106. Then, various types of correction processing such as white balance correction and gamma correction are applied to the image data subjected to the column noise correction processing.

The image data subjected to the various types of correction processing in the digital signal processing unit 110 is supplied to a display unit 117 via a control unit 111 and a display interface unit 116, and displayed on the display unit 117. For the display unit 117, for example, an LCD is used as a display element.

The digital signal processing unit 110 also can apply compression coding processing to the image data subjected to the various types of correction processing. For example, the digital signal processing unit 110 stores the image data subjected to the various types of correction processing temporarily in an image memory 112 via the control unit 111, and applies compression coding processing to the image data stored in the image memory 112. The compressed image data subjected to compression coding is recorded on a recording medium 119 composed of, for example, a nonvolatile memory, for example, via the control unit 111 and a recording interface unit 118.

The control unit 111 has, for example, a CPU, a ROM, and a RAM, and controls operation of the entire image sensing apparatus 300. More specifically, the CPU uses the RAM as a workspace to execute a program stored in advance in the ROM and transmits commands to each unit of the image sensing apparatus 300, and controls the flow of data in the image sensing apparatus 300. Furthermore, the control unit 111 can communicate with an external information device such as a personal computer via an external interface 120.

A shutter button 130 can detect a state of the button pressed halfway and a state of the button pressed fully in which the button is completely pressed, from which a control signal in accordance with the state is output. The control unit 111 controls the timing at which the image sensing apparatus 300 is moved into a preparatory state for shooting and the timing at which the shutter 130 is opened, depending on the control signal output from the shutter button 130.

A timing generation unit 115 generates timing signals to be supplied to each of the image sensor 100, the analog front end unit 106, and the digital signal processing unit 110, in accordance with control exercised by the control unit 111. More specifically, the timing generation unit 115 generates a signal HD, a signal φHST, a signal φH, and a signal φCHR, in accordance with control exercised by the control unit 111. Furthermore, the timing generation unit 115 generates a signal φSELn, a signal φRESn, a signal φTXn, a signal φCLAMP, a signal φTN, and a signal φTS, in accordance with control exercised by the control unit 111. These signals generated by the timing generation unit 115 are supplied to the image sensor 100. Furthermore, among the signals generated by the timing generation unit 115, for example, the signal HD, the signal φHST, and the signal φH are supplied to the analog front end unit 106 and the digital signal processing unit 110. The image sensor 100, the control unit 111, and the timing generation unit 115 and the like together constitute an image sensing system for driving the image sensor 100.

Next, operation of the image sensing apparatus 300, which has the above-described configuration of FIG. 17 during shooting will be described. The operation of a power switch, not shown, turns ON a main power supply. When the main power source is turned ON, the power supply for the control system such as the control unit 111 and the timing generation unit 115 is turned ON, and further, the power supply for the shooting system circuit such as the analog front end unit 106 and the digital signal processing unit 110 is turned ON.

After turning on the power supplies for each unit, when the shutter button 130 is operated, the control unit 111 controls the aperture control unit 113 to open the aperture 102 and controls the shutter control unit 114 to open the shutter 103, in order to control the light exposure amount. Image signals output from the image sensor 100 are subjected to noise processing and gain adjustment in the analog front end unit 106, further converted to digital image data, and then supplied to the digital signal processing unit 110. The control unit 111 calculates exposure on the basis of the image data supplied to the digital signal processing unit 110. The control unit 111 determines the brightness of the subject on the basis of the result of the exposure calculation, and controls the aperture control unit 113 depending on the determination result.

When the aperture control is carried out, the control unit 111 extracts a high frequency component from the image signals output from the image sensor 100 and calculates the distance to the subject. After that, the control unit 111 controls a lens driving unit, not shown, to drive the lens and determines whether or not the lens is in focus, and drives the lens again to measure the distance when the control unit 111 determines that the lens is not in focus.

When it is determined the lens is in focus, the control unit 111 controls the timing generation unit 115 to drive the image sensor 100 to the charge accumulation state for the respective pixels 50, 50, . . . , controls the shutter control unit 114 to open the shutter 103, and starts exposure of the image sensor 100. Electrical charges are accumulated in the photodiode 2 of each pixel 50 by this exposure. The control unit 111 closes the shutter 103 after elapse of a predetermined exposure time to complete exposure of the image sensor 100. It is to be noted that exposure may be started and completed by an electronic shutter function of the image sensor 100.

After exposure is completed, the control unit 111 controls the timing generation unit 115 to release the accumulation state of the image sensor 100, and moves the image sensor 100 into a period for reading out electrical charges from the pixels 50, 50, . . . . In the reading period, electrical charges stored in the photodiode 2 are transferred to the accumulation capacitor 5 in each pixel 50, and the electrical charges accumulated in the accumulation capacitor 5 are sequentially output as image signals from the image sensor 100 for each row of pixels 50, 50, . . . . The image signals output from the image sensor 100 are subjected to noise removal processing such as correlated double sampling (CDS), gain adjustment processing, etc. in the analog front end unit 106, and then subjected to A/D conversion to obtain digital image data. This image data is supplied to the control unit 111 via the digital signal processing unit 110, and written in the image memory 112.

The image data written in the image memory 112 is recorded on the recording medium 119 via the recording interface unit 118, in accordance with control exercised by the control unit 111. At this point, the image data written in the image memory 112 by the digital signal processing unit 110 can be subjected to compression coding and recorded on the recording medium 119. Furthermore, the image data written in the image memory 112 can be supplied to the display unit 117 via the display interface unit 116 and displayed on the display unit 117. The image data written in the image memory 112 can also be transferred to a personal computer 121 or the like via the external interface 120, and processed on the personal computer 121.

Next, the timing of column noise acquisition, which is preferable when an image sensor and a driving method for the image sensor according to the present invention are applied to the image sensing apparatus 300 which has the above-described configuration as in FIG. 17, will be described with reference to timing charts of FIGS. 18A to 18D.

Figure 18A:
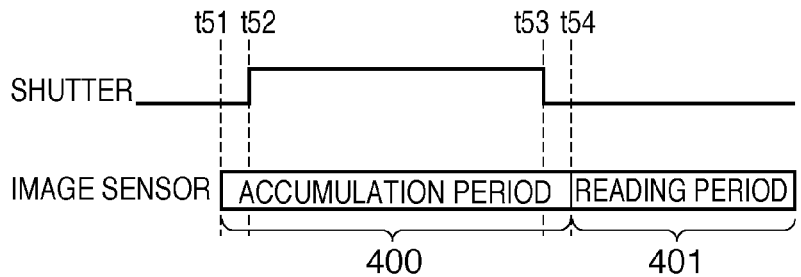
FIGS. 18A to 18D are timing charts for explaining preferable timings for column noise acquisition operation according to the present invention.

FIG. 18A shows a timing example in a case in which only normal readout is carried out, without carrying out column noise acquisition operation in the image sensor 100. After the shutter button 130 is operated, the image sensor 100 is put into an accumulation state at time t51, and at time t52 the shutter 103 is opened to start exposure of the image sensor 100. Between time t51 and time t52, for example, resetting of the pixels 50, 50, . . . of the image sensor 100, etc. is carried out. Then, at time t53, the shutter 103 is closed to complete exposure, and the accumulation state of the image sensor 100 is released at time t54. The period from time t51 at which the image sensor 100 is put into the accumulation state to time t54 at which the accumulation state is released is an accumulation period 400. After releasing the accumulation state, the operation of the image sensor 100 moves into a reading period 401. During the reading period 401, electrical charges are read out from the pixels 50, 50, . . . in the image sensor 100, and the electrical charges read out are output as image signals to the outside of the image sensor 100.

In the present invention, column noise acquisition operation is carried out prior to moving the operation of the image sensor 100 into the reading period 401. This allows column noise correction to be carried out for the image signals output from the image sensor 100, obtaining favorable images without vertical-stripe column noise.

Figure 18B:
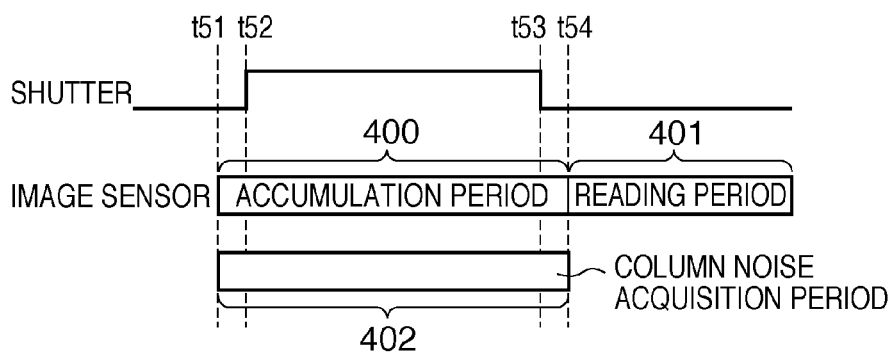

FIG. 18B shows an example in which column noise acquisition is carried out during the accumulation period 400 of the image sensor 100. In the example of FIG. 18B, the accumulation period 400 and a column noise acquisition period 402 coincide with each other. More specifically, in the present invention, column noise acquisition is carried out on the basis of electrical charges accumulated in the transfer capacitors 25, without connecting the circuits of the pixels 50, 50, . . . to the vertical output lines 8. Therefore, in the image sensor 100, column noise acquisition operation can be carried out while electrical charges are accumulated in the pixels 50, 50, . . . . Carrying out column noise acquisition during the accumulation period 400 allows shooting without any time lag for column noise acquisition.

It is to be noted although the accumulation period 400 and the column noise acquisition period 402 coincide with each other in the example of FIG. 18B, the present invention is not limited thereto. Thus, for example, in a case in which the image sensor 100 has less random noise, or in a case in which the accumulation period 400 is a predetermined period or longer, column noise acquisition may be carried out during a period within the accumulation period 400.

Figure 18C:
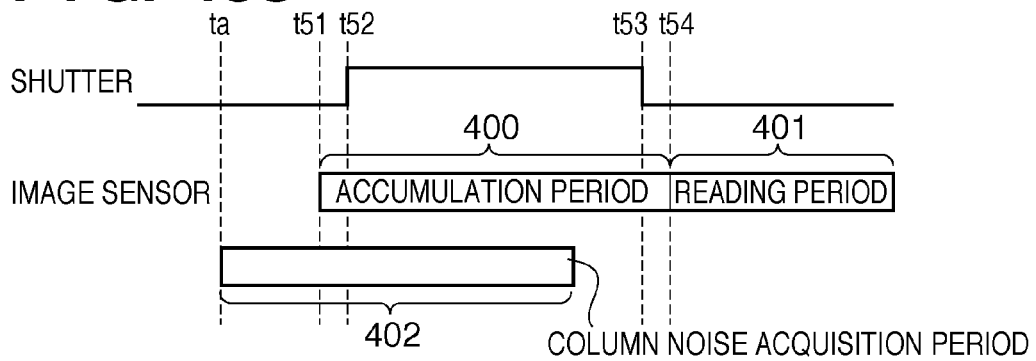

FIG. 18C shows an example in which column noise acquisition operation is started at time ta prior to start time t51 of the accumulation period 400 and the column noise acquisition operation is completed before competing the accumulation period 400, as indicated by a column noise acquisition period 402. In the case of the example of FIG. 18C, the image sensor 100 has only the accumulation period 400 left after the column noise acquisition period 402 and the accumulation period 400 partially overlap.

During the periods for which the image sensor 100 is driven at high speed, such as during reading out of electrical charges from the pixels 50, 50, . . . and during the column noise acquisition, the image sensor 100 may generate heat, and the heat may affect the image quality. As in the example of FIG. 18C, when the image sensor 100 is driven in such a way that the period for carrying out charge accumulation is provided after the column noise acquisition period 402 is completed, followed by the start of the reading period 401, heat generation in the image sensor 100 is reduced. Therefore, image signals can be obtained with less image deterioration due to the effect of heat generated by the image sensor 100 itself.

It is to be noted that the time ta is not particularly limited as long as the time ta is set before the start of the accumulation period 400 and there is a period for allowing heat generation in the image sensor 100 to be reduced between the end of the column noise acquisition period 402 and the start of the reading period 401. For example, the time ta can be determined with the state of the shutter button 130 pressed halfway as a trigger. Without being limited to this example, the end of a previous reading period 401 or the time after elapse of a predetermined period from that end may be set as the time ta.

Figure 18D:
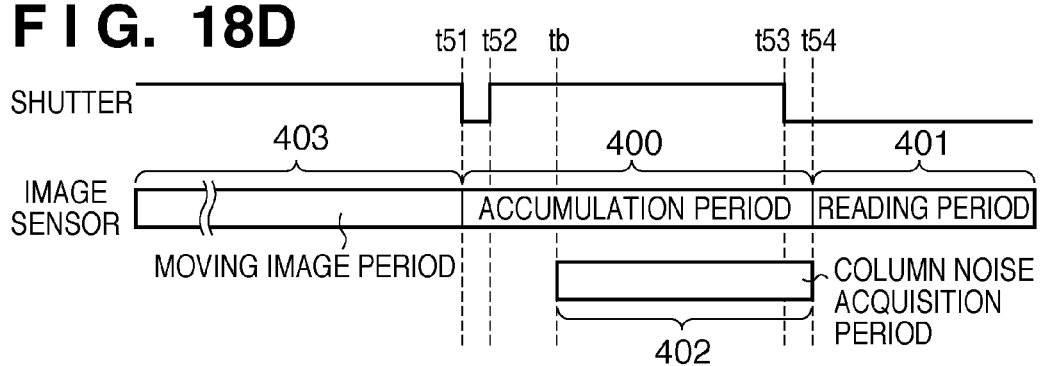

FIG. 18D is an example in which column noise acquisition operation is started after the start of the accumulation period 400, that is, at time tb a predetermined period after start time t51. The example of FIG. 18D is a preferable example used in a case in which the accumulation period 400 is started immediately after another driving mode. As another driving mode, a live view mode, in which the image sensor 100 is continuously driven to display moving images on the display unit 117, is conceivable.

In this case, the image sensor 100 generates heat and reaches a high temperature during a moving image period 403 during which the image sensor 100 is continuously driven. Thus, in a case in which column noise acquisition operation is started immediately after completing the moving image period 403, there is a possibility that column noise may be acquired incorrectly due to signal degradation caused by the effect of heat generated by the image sensor 100. When column noise acquisition operation is started after elapse of a predetermined period from the end of the moving image period 403, the effect of heat generation during the moving image period 403 is reduced, thereby allowing column noise to be acquired more correctly.

As described above, according to the seventh embodiment of the present invention, correction data for reducing column noise can be acquired with sufficient accuracy without the use of a pixel region exclusive for correction data acquisition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-190231, filed on Jul. 23, 2008, which is hereby incorporated by reference herein in its entirety.

What is claimed is:

1. An image sensing system comprising:
    an image sensor in which a plurality of pixels are arranged in a matrix, wherein the plurality of pixels include a plurality of photoelectric conversion elements, a plurality of source follower amplifiers configured to amplify and convert charges accumulated in a plurality of accumulation units into voltage signals, a plurality of transfer units configured to transfer charges generated in the plurality of photoelectric conversion elements to the plurality of accumulation units, a plurality of selection switches configured to connect the plurality of source follower amplifiers to corresponding ones of a plurality of output lines that are arranged for a plurality of columns, and a plurality of column circuits provided for the plurality of output lines;
    a correction data acquiring unit configured to acquire correction data based on signals generated by operating the plurality of column circuits with the plurality of selection switches off; and
    a correction unit configured to correct signals from the plurality of pixels using the correction data with the plurality of selection switches on.

2. The image sensing system according to claim 1, wherein the plurality of column circuits are formed in the image sensor in an on-chip manner using a CMOS structure.

3. The image sensing system according to claim 1, wherein each of the plurality of column circuits includes a column amplifier, a transfer gate, and a capacitor.

4. The image sensing system according to claim 1, wherein each of the plurality of column circuits includes a column A/D converter.

5. The image sensing system according to claim 3, wherein each of the plurality of column circuits further includes a constant current source and a source follower amplifier.

6. The image sensing system according to claim 3, wherein each of the plurality of column circuits further includes a column A/D converter.

7. A control method for an image sensing system that includes an image sensor in which a plurality of pixels are arranged in a matrix, wherein the plurality of pixels include a plurality of photoelectric conversion elements, a plurality of source follower amplifiers configured to amplify and convert charges accumulated in a plurality of accumulation units into voltage signals, a plurality of transfer units configured to transfer charges generated in the plurality of photoelectric conversion elements to the plurality of accumulation units, a plurality of selection switches configured to connect the plurality of source follower amplifiers to corresponding ones of a plurality of output lines that are arranged for a plurality of columns, and a plurality of column circuits provided for the plurality of output lines, the control method comprising:
    a correction data acquiring step of acquiring correction data based on signals generated by operating the plurality of column circuits with the plurality of selection switches off; and
    a correction step of correcting the signals from the plurality of pixels using the correction data with the plurality of selection switches on.

8. The control method according to claim 7, wherein each of the plurality of column circuits includes a column amplifier, a transfer gate, and a capacitor.

9. The control method according to claim 7, wherein each of the plurality of column circuits includes a column A/D converter.

10. The control method according to claim 8, wherein each of the plurality of column circuits further includes a constant current source and a source follower amplifier.

11. The control method according to claim 8, wherein each of the plurality of column circuits further includes a column A/D converter.

* * * * *